US008050951B2

(12) United States Patent
Porter

(10) Patent No.: US 8,050,951 B2
(45) Date of Patent: Nov. 1, 2011

(54) METHOD, COMPUTER PROGRAM PRODUCT, AND SYSTEM FOR RISK MANAGEMENT

(75) Inventor: Keith Alan Porter, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 1353 days.

(21) Appl. No.: 11/173,054

(22) Filed: Jul. 1, 2005

(65) Prior Publication Data
US 2006/0041406 A1  Feb. 23, 2006

Related U.S. Application Data

(63) Continuation-in-part of application No. 10/862,185, filed on Jun. 4, 2004.

(60) Provisional application No. 60/585,260, filed on Jul. 1, 2004.

(51) Int. Cl.
*G06Q 40/00* (2006.01)
(52) U.S. Cl. ............................... 705/7; 705/37; 705/38
(58) Field of Classification Search ................ 705/7, 37, 705/38
See application file for complete search history.

(56) References Cited

U.S. PATENT DOCUMENTS

| 2002/0194113 A1* | 12/2002 | Lof et al. | 705/37 |
| 2003/0046128 A1* | 3/2003 | Heinrich | 705/7 |
| 2004/0215551 A1* | 10/2004 | Eder | 705/38 |

OTHER PUBLICATIONS

American Society for Testing and Materials (ASTM), 1999, E 2026-99 Standard Guide for the Estimation of Building Damageability in Earthquakes, West Conshohocken, PA.
Applied Technology Council., 1985, ATC-13: Earthquake Damage Evaluation Data for California, Redwood City, CA.
Beck, J.L., Kiremidjian, A.S., Wilkie, S., Mason, A., Salmon, T., Goltz, J., Olson, R., Workman, J., Irfanoglu, A., and Porter, K., 1999, Decision Support Tools for Earthquake Recovery of Businesses, Final Report, CUREe-Kajima Joint Research Program Phase III, Consortium of Universities for Earthquake Engineering Research, Richmond, CA.

(Continued)

*Primary Examiner* — Charles R. Kyle
*Assistant Examiner* — Siegfried E. Chencinski
(74) *Attorney, Agent, or Firm* — Tope-McKay & Associates

(57) ABSTRACT

Described are a method, computer program product, and system for risk management using readily available, gridded hazard data to estimate and obtain a risk analysis parameter (e.g., expected repair cost) for use in risk management, such as in seismic risk management. The method includes calculating economic risk for buildings in terms of an expected annualized loss (EAL). EAL is the product of a scenario loss estimate called probable frequent loss (PFL) and an economic hazard coefficient (H). H can be created using readily available gridded hazard data produced by the U.S. Geological Survey. The method also includes a technique for calculating shaking intensity, $s_{EBE}$, which is needed for determining PFL. Incorporated into a system, the system can be utilized by engineering consultants (or others interested in risk management) via the Internet, or on any other computer readable medium.

13 Claims, 6 Drawing Sheets

OTHER PUBLICATIONS

Beck, J.L., Porter, K.A., Shaikhutdinov, R.V., Au, S.K., Moroi, T., Tsukada, Y., and Masuda, M., 2002, Impact of Seismic Risk on Lifetime Property Values, Final Report, Consortium of Universities for Research in Earthquake Engineering, Richmond, CA, http://resolver.caltech.edu/caltechEERL:2002.EERL-2002-04.

Holland, A.S., Ott, S.H., and Riddiough, T.J., 2000, The role of uncertainty in investment: an examination of competing investment models using commercial real estate data: Real Estate Economics, 28, 33-64.

Insurance Information Institute, 2003, Facts and Statistics: Homeowners Insurance, www.iii.org/media/facts/statsbvissue/homeowners/.

National Institute of Building Sciences (NIBS) and Federal Emergency Management Agency (FEMA), 1999a, HAZUS-99 Software, FEMA, Washington, DC, www.fema.gov/hazus/.

National Institute of Building Sciences (NIBS) and Federal Emergency Management Agency (FEMA), 1999b, HAZUS Technical Manual, FEMA, Washington, DC, www.fema.gov/hazus/.

Porter, K.A., 2003a, PEER Testbeds Homepage, http://www.peertestbeds.net.

Porter, K.A., 2003b, An Overview of PEER's Performance-Based Earthquake Engineering Methodology, Proc. Ninth International Conference on Applications of Statistics and Probability in Civil Engineering (ICASP9) Jul. 6-9, 2003, San Francisco, CA.

Porter, K.A., Beck, J.L., and Shaikhutdinov, R.V., 2002a, Sensitivity of building loss estimates to major uncertain variables: Earthquake Spectra, 18 (4), Earthquake Engineering Research Institute, Oakland, CA, 719-743, http://keithp.caltech.edu/publications.htm.

Porter, K.A., Beck, J.L., Seligson, H.A., Scawthorn, C.R., Tobin, L.T., and Boyd, T., 2002b, Improving Loss Estimation for Woodframe Buildings, Consortium of Universities for Research in Earthquake Engineering, Richmond, CA. http://resolver.library.caltech.edu/caltechEERL:2002.EERL-2002-01 (main report) and http://resolver.library.caltech.edu/caltechEERL:2002.EERL-2002-02 (appendices).

Porter, K.A., Kiremidjian, As. and LeGrue, J.S., 2001, Assembly-based vulnerability of buildings and its use in performance evaluation: Earthquake Spectra, 17 (2), Earthquake Engineering Research Institute, . Oakland, CA, 291-312.

Reitherman, R., and K. Cobeen, in press, Design Documentation of the Woodframe Project Index Buildings, Consortium of Universities for Research in Earthquake Engineering (CUREE), Richmond, CA.

Risk Engineering, 2002, ST-RISK Software, Version 3.2, www.st-risk.com.

Rubin, H.W., 1991, Dictionary of Insurance Terms, Barron's Educational Services Inc., New York, NY.

Zadeh, M.M., 2000, Understanding risk management: Financial Management of Earthquake Risk, Earthquake Engineering Research Institute, Oakland CA, 1-14.

Trifunac, M.D., and Brady, A.G., 1975, On the correlation of seismic intensity scales with the peaks of recorded strong ground motion: Bulletin of the Seismological Society of America, 65, 139-162.

Spetzler, C.S., 1968. The development of a corporate risk policy for capital investment decisions: IEEE Transactions on Systems Science and Cybernetics, vol. SSC-4, No. 3., Sep. 1968, Institute of Electronics and Electrical Engineers, pp. 279-300, reprinted in R.A. Howard and J. E. Matheson. eds., 1989, Readings on the Principles and Applications of Decision Analysis, vol. 2: Professional Collection, Strategic Decisions Group, Menlo Park, CA, 667-688.

International Code Council, 2000, International Building Code 2000, International Conference of Building Officials, Whittier, CA.

Czarnecki, R.M., 1973, Earthquake Damage to Tall Buildings, Structures Publications 359, Massachusetts Institute of Technology, Cambridge, MA.

Federal Emergency Management Agency (FEMA), 1997, FEMA 273, NEHRP Guidelines for the Seismic Rehabilitation of Buildings, Washington, DC.

Howard, R.A., and J.E. Matheson, eds., 1989, Readings on the Principles and Applications of Decision Analysis, Strategic Decisions Group, Menlo Park, CA.

* cited by examiner

| Site class | s≤0.25g | s=0.50g | s=0.75g | s=1.00g | s≥1.25g |
|---|---|---|---|---|---|
| A | 0.80 | 0.80 | 0.80 | 0.80 | 0.80 |
| AB | 0.90 | 0.90 | 0.90 | 0.90 | 0.90 |
| B | 1.00 | 1.00 | 1.00 | 1.00 | 1.00 |
| BC | 1.10 | 1.10 | 1.05 | 1.00 | 1.00 |
| C | 1.20 | 1.20 | 1.10 | 1.00 | 1.00 |
| CD | 1.40 | 1.30 | 1.15 | 1.05 | 1.00 |
| D | 1.60 | 1.40 | 1.20 | 1.10 | 1.00 |
| DE | 2.05 | 1.55 | 1.20 | 1.00 | 0.95 |
| E | 2.50 | 1.70 | 1.20 | 0.90 | 0.90 |

FIG. 1

| Site class | $s \leq 0.1g$ | $s=0.2g$ | $s=0.3g$ | $s=0.4g$ | $s \geq 0.5g$ |
|---|---|---|---|---|---|
| A | 0.80 | 0.80 | 0.80 | 0.80 | 0.80 |
| AB | 0.90 | 0.90 | 0.90 | 0.90 | 0.90 |
| B | 1.00 | 1.00 | 1.00 | 1.00 | 1.00 |
| BC | 1.35 | 1.30 | 1.25 | 1.20 | 1.15 |
| C | 1.70 | 1.60 | 1.50 | 1.40 | 1.30 |
| CD | 2.05 | 1.80 | 1.65 | 1.50 | 1.40 |
| D | 2.40 | 2.00 | 1.80 | 1.60 | 1.50 |
| DE | 2.95 | 2.60 | 2.30 | 2.00 | 1.95 |
| E | 3.50 | 3.20 | 2.80 | 2.40 | 2.40 |

FIG. 2

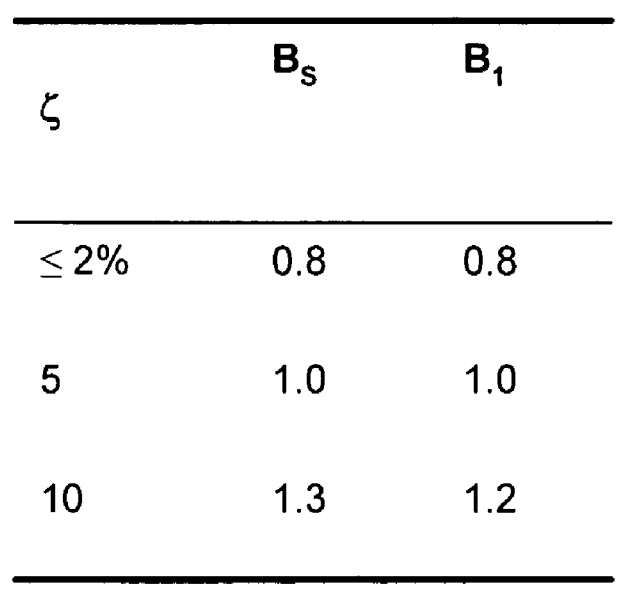

| $\zeta$ | $B_s$ | $B_1$ |
|---|---|---|
| ≤ 2% | 0.8 | 0.8 |
| 5 | 1.0 | 1.0 |
| 10 | 1.3 | 1.2 |

FIG. 3

METHOD, COMPUTER PROGRAM PRODUCT, AND SYSTEM FOR RISK MANAGEMENT

PRIORITY CLAIM

This application is a Continuation In Part Application, claiming the benefit of priority to non-provisional application number 10/862,185, filed in the United States on Jun. 4, 2004, and titled "Method, Computer Program Product, and System for Risk Management," and also claiming the benefit of priority to provisional application No. 60/585,260, filed in the United States on Jul. 1, 2004, titled, "A Method and Software Application for Calculating the Site Economic Hazard Coefficient and Economic-Basis Event Shaking Intensity from Gridded Hazard Data."

BACKGROUND OF THE INVENTION (1) Technical Field

The present invention relates to risk management. More specifically, the present invention relates to a method, computer program product, and system for employing readily available, hazard data to estimate an expected repair cost for use in risk management, such as in seismic risk management.

(2) Description of Related Art

The field of seismic risk management has been gradually developing over the past few decades, increasingly enabled by technological advances in software and driven by a need for more informed property ownership decisions.

Seismic risk enters into several important real estate decision-making processes, such as the purchase of investment property, performance-based design of new structures, seismic rehabilitation of existing buildings, and decisions regarding the purchase of earthquake insurance. In such situations, example of important factors include who the decision-makers are, how they make decisions, what aspects of seismic risk most concern them, and the length of their planning horizon.

Economic seismic risk to large commercial properties in seismically active regions with commercial mortgages is assessed every time the property changes hands, typically on the order of every five to ten years. By contrast, a building is designed and built only once. Thus, the most common opportunities for market forces to bring about seismic-risk mitigation for commercial properties are at times of sale. Anecdotal evidence suggests that these are mostly missed opportunities, as risk is typically not mitigated, even in more vulnerable buildings.

This can be partly explained by considering the context in which seismic assessments are performed. During virtually every sale of an existing commercial building, the buyer assesses the building's investment value using a financial analysis that considers revenues and expenses, rent roll, market leasing, physical condition, and other property information. The investor makes his or her bidding decision based on projected income and expenses, using one or more of the economic performance metrics of net present value, net operating income, cash flow, internal rate of return, and capitalization rate.

The input to this financial analysis is typically provided by a real estate broker representing the seller, whose figures the investor checks and modifies during a due-diligence study. Many of the inputs are known values, such as the quantity of leases, duration, and income from current leases. However, many other values are uncertain. Vacancy rates, market rents, and other important parameters fluctuate significantly and unpredictably, leading to substantial uncertainty in the future economic performance of a property. In the face of these uncertainties, the bidder usually estimates investment value using best-estimate inputs and then again with deterministic sensitivity studies to probe conditions that would lead to poor performance (higher future vacancy rates, for example). The future cost to repair earthquake damage is not one of the parameters the bidder uses in the financial analysis. This is important because seismic risk is not a market quantity.

The real estate market is not wholly without forces to influence seismic-risk mitigation. The due-diligence study typically includes an engineering assessment of the condition of the property, which itself typically includes an estimate of the earthquake probable maximum loss (PML). PML is by far the dominant earthquake risk parameter in financial circles.

The earthquake PML has no standard quantitative definition. Most working definitions involve the level of loss associated with a large, rare event. One definition is that PML is the $90^{th}$ percentile of loss given the occurrence of what building codes until recently called the design basis earthquake (DBE). The DBE is an event producing a shaking intensity with 10% exceedance probability in 50 years. Colloquially (and inexactly), this is an upper-bound loss given the 500-year earthquake. More accurately, assuming Poisson arrivals of earthquakes, this shaking level has a mean occurrence rate of $0.00211$ $yr^{-1}$ and a mean recurrence time of 475 years. Because this PML is the $90^{th}$ percentile loss given this level of shaking, the PML-level loss can have a much longer mean recurrence time.

Commercial lenders often use PML to help decide whether to underwrite a mortgage. It is common, for example, for a commercial lender to refuse to underwrite a mortgage if the PML exceeds 20% to 30% of the replacement cost of the building, unless the buyer purchases earthquake insurance, a costly requirement that often causes the investor to decide against bidding. Once the PML hurdle is passed, the bidder usually proceeds to ignore seismic risk, for at least the following:

1. Irrelevant planning period. Investors plan on the order of 5 years, making loss corresponding to shaking intensity with a 500-year recurrence time largely irrelevant, too rare even for consideration in a sensitivity study.

2. Incompatibility with financial analysis. PML is a scenario value, not an ongoing cost that can be reflected in a cashflow analysis.

3. Custom. Investors are not required by custom or regulation to include seismic risk in the financial analysis.

Lacking any measure of economic risk beyond PML, the bidder has no basis for assessing how the seismic risk of a building should influence the purchase price or for judging whether seismic risk mitigation might be worth exploring. Faced with a high PML, the bidder might increase the discount rate used in the financial analysis to reduce the present value of the future net income stream.

Improving upon the prior art in order to increase the efficacy of seismic risk analysis, the Applicant previously filed application number 10/862,185, entitled, "Method, Computer Program Product, and System for Risk Management (hereinafter Application '185)." The prior application discloses a method for the calculation of economic seismic risk for buildings in terms of expected annualized loss (EAL) and a scenario loss estimate called probable frequent loss (PFL), both of which measure a building owner's risk of earthquake-damage repair costs. Application '185 disclosed that PFL can be reasonably estimated using a simplified performance-based earthquake engineering (PBEE) analysis that involves a single linear structural analysis and some simple calculations of loss conditioned on structural response.

It was shown that:

$$EAL \approx H \cdot PFL, \quad (1)$$

where $$H \equiv \frac{G_{NZ}}{\ln(G_{NZ}/G_{EBE})}, \quad (2)$$

in which EAL is defined as the expected annualized value of repair cost to a particular building in a particular location and H is referred to as the economic hazard coefficient. The PFL is a scenario loss estimate: the estimated mean building repair cost conditioned on the occurrence of shaking in the economic-basis event, EBE. The EBE is defined as the event producing site shaking with 10% probability of exceedance in 5 years (Compare with the design-basis earthquake, DBE, whose shaking intensity has 10% exceedance probability in 50 yr.). The site shaking intensity of the EBE is denoted by $s_{EBE}$. $G_{EBE}$ is the mean exceedance frequency at that site of the shaking intensity $s_{EBE}$. $G_{NZ}$ refers to the mean exceedance frequency of the lowest shaking intensity $s_{NZ}$ that would produce a nonnegligible repair cost. The intensities $s_{NZ}$ and $s_{EBE}$ are measured in terms of damped elastic spectral acceleration at period T and damping ratio $\zeta$.

Note that the methodology also produces reasonable estimates of EAL if EBE is defined slightly differently. For example, it was found that similar results are produced for EBE defined as the event producing site shaking with a 50% probability of exceedance in 50 years. The value of defining EBE as is done here (10% in 5 yr, rather than 50% in 50 yr) is for its relevance to the typical commercial real-estate investor, for whom 50 years is too long a planning period.

The methodology for calculating PFL, H, and EAL is expected to be of value to commercial real-estate investors and possibly other stakeholders of high-value buildings in seismically active regions. For example, it is useful in several identifiable ways:

a. Relevant scenario loss for the investor's sensitivity study. First, the PFL reflects a reasonable upper-bound loss within the typical investor's planning period (mean loss conditioned on shaking with 10% exceedance probability in 5 years). This is in contrast with the commonly-estimated probable maximum loss (PML), which tends to reflect a loss associated with the DBE. While shaking and loss with 500-yr or longer return period is far too rare to be of interest to the typical commercial investor, PFL could be reasonably employed in the investor's sensitivity studies. The investor typically examines impact on investment value (measured, e.g., by return on equity) under various what-if situations, such as future vacancy rates that are higher than expected, or market rents that are lower than expected. The investor would know that PFL could calculate by how much return on equity is reduced if the EBE occurs.

b. Investor can reflect seismic risk as an operating expense. PFL can be multiplied by H to produce EAL, which can be readily employed as an operating expense in the investor's financial analysis. Banks are already beginning to quantify their seismic risk in terms of EAL; real-estate investors may not be far behind.

c. Short learning curve for investor and engineering consultant. PFL is conceptually very similar to PML, and should be readily understood both by investors who already understand PML, and by engineering consultants who currently estimate PML for investors. EAL should also be readily understood by investors as amortized seismic risk. The investor need not understand seismic vulnerability nor seismic hazard, and the engineering consultant need not create a complete seismic vulnerability function or seismic hazard function.

d. A new consulting product for little extra work. The engineer who estimates PML can at the same time estimate PFL using the same information and procedures. By looking up H on a paper map or electronic database, and calculating EAL as the product of H and PFL, the consultant can provide his or her client with valuable new information for little additional effort. The same maps and database can, incidentally, provide the consultant with EBE and DBE shaking intensity.

While the prior invention presented a method to calculate seismic risk management by calculating PFL and EAL, given $s_{NZ}$, $G_{NZ}$, $s_{EBE}$, and $G_{EBE}$, it did not provide a method for calculating $G_{NZ}$, $s_{EBE}$, $G_{EBE}$. Thus, a continuing need exists for a system and methodology for employing readily available, gridded hazard data to calculate $G_{NZ}$, $s_{EBE}$, $G_{EBE}$, and thereby H, for any geographic location and fundamental period (T) within the boundaries of the gridded data.

SUMMARY OF THE INVENTION

The present invention relates to risk management. More specifically, the present invention relates to a method, computer program product, and system for employing readily available, hazard data to estimate and obtain a risk analysis parameter (e.g., estimated repair cost) for use in risk management, such as in seismic risk management.

The method for obtaining a risk analysis parameter using a data processing system having an input and an output, comprises acts of:

a. querying a user to input at least one of the following input parameters into the input:
  i. location $\hat{o}=(\hat{\phi}, \hat{\lambda})$, where $\hat{o}$ denotes a longitude and latitude of a facility in question;
  ii. site classification $\hat{c}$, where the site classification reflects geological characteristics of soil at the facility in question;
  iii. period of interest $\hat{T}$, where $\hat{T}$ denotes a user's estimate of the small-amplitude fundamental period of vibration of the facility in question;
  iv. damping ratio $\hat{\zeta}$, where the damping ration is a mathematical characteristic of an idealized structural system of the facility in question;
  v. loss-threshold shaking $s_{NZ}$, where the loss-threshold shaking is a minimum level of shaking at which non-negligible damage occurs;
  vi. planning period $t_{EBE}$, where the planning period is the period an investor uses in a financial analysis for the facility in question; and
  vii. exceedance probability $p_{EBE}$, where the exceedance probability is the probability that earthquake shaking of intensity $s_{EBE}$ or greater will occur during planning period $t_{EBE}$;

b. calculating a risk analysis parameter based upon at least one of the input parameters;

c. outputting the risk analysis parameter through the output, whereby through the risk analysis parameter, a user may calculate an expected annualized loss (EAL) according to the following:

$$EAL = H \times PFL,$$

wherein PFL represents a probable frequent loss, average loss conditioned on a seismic intensity associated with an economic-basis earthquake, and H represents an economic hazard coefficient.

In another aspect, in the act of calculating a risk analysis parameter, the risk analysis parameter is hazard coefficient H, and the act of calculating hazard coefficient H further comprises acts of:

a. calculating $G_{EBE}$, where $G_{EBE}$ is an average exceedance frequency of $s_{EBE}$, and where $s_{EBE}$ is the seismic intensity associated with an economic-basis earthquake;

b. identifying grid points closest to ô for location $\hat{o}=(\hat{\phi},\hat{\lambda})$, where $\hat{\phi}$ denotes a latitude designation and $\hat{\lambda}$ denotes a longitude designation, the grid points closest to $\hat{\lambda}$ being referred to as the bounding grid points $o_j$;

c. considering the period of interest $\hat{T}$, determining a period of at least one hazard curve, referred to as a bounding period $T_i$;

d. letting $s_{r,k}$ denote the $k^{th}$ value ($k=1, 2, \ldots n_s$) of $s_r$ in the hazard curve $G(s_r|o_j,c=c_r,T=T_i,\zeta=\zeta_r)$ and adjusting $s_{r,k}$ for each bounding grid point $o_j$ and bounding period $T_i$ to account for site classification $\hat{c}$ and for damping ratio $\hat{\zeta}$, where s is seismic intensity and where adjusting $s_{r,k}$ is done by multiplying $s_{r,k}$ by a site-classification coefficient $F_c$ and a damping coefficient $F_\zeta$, where by denoting by $s_k$ the $k^{th}$ value of s at the same location and period after adjusting for site classification and damping ratio, $$G(s_k|o_j,c=\hat{c},T=T_i,\zeta=\hat{\zeta})=G(F_cF_\zeta s_{r,k}|o_j,c=c_r,T=T_i,\zeta=\zeta_r): k=1,2,\ldots n_s;$$

e. letting $G_{i,j,NZ}$ denote the damping- and site-class-adjusted average exceedance frequency of $s_{NZ}$ given period $T_i$ and location $o_j$, and for each $T_i$ and $o_j$, interpolating each curve from "Act d" to determine $G_{i,j,NZ}$;

f. letting $G_{j,NZ}$ denote the damping- and site-class-adjusted value of $G_{NZ}$ at the period of interest $\hat{T}$ and location $o_j$, and for each j, calculating $G_{j,NZ}$;

g. letting $G_{NZ}$ denote the damping- and site-class-adjusted value of $G_{NZ}$ at the period of interest $\hat{T}$ and location of interest ô, and calculating $G_{NZ}$;

h. calculating risk analysis parameter H (i.e., hazard coefficient) according to the following:

$$H \equiv \frac{G_{NZ}}{\ln(G_{NZ}/G_{EBE})},$$

whereby through H, a user may calculate an expected annualized loss (EAL) according to the following:

$$EAL = H \times PFL,$$

wherein PFL represents a probable frequent loss, mean loss conditioned on an occurrence of $s_{EBE}$.

In another aspect, in the act of calculating $G_{EBE}$, $G_{EBE}$ is calculated based on $t_{EBE}$ and $p_{EBE}$ assuming Poisson earthquake arrivals according to the following:

$$G_{EBE} = -\ln(1-p_{EBE})/t_{EBE},$$

where $G_{EBE}$ is a mean annual exceedance frequency of $s_{EBE}$, and where $s_{EBE}$ is the seismic intensity associated with an economic-basis earthquake.

In yet another aspect, the act of identifying grid points closest ô for location $\hat{o}=(\hat{\phi},\hat{\lambda})$, further comprises acts of identifying four grid points closest to ô for location $\hat{o}=(\hat{\phi},\hat{\lambda})$, where $\hat{\phi}$ denotes a latitude designation and $\hat{\lambda}$ denotes a longitude designation, the four grid points closest to ô being referred to as the bounding grid points $o_1=(\phi_1, \lambda_1)$, $o_2=(\phi_1+\Delta\phi, \lambda_1)$, $o_3=(\phi_1, \lambda_1+\Delta\lambda)$ and $o_4=(\phi_1+\Delta\phi,\lambda_1+\Delta\lambda)\}$, where $o_1, o_2, o_3, o_4 \in \{(\phi_r, \lambda_r)\}$ such that $\phi_{min} \leq \phi_1 < \hat{\phi} \leq \phi_1+\Delta\phi \leq \phi_{max}$ and $\lambda_{min} \leq \lambda_1 < \hat{\lambda} \leq \lambda_1+\Delta\lambda \leq \lambda_{max}$, and calculating x and y according to the following:

$$x=(\hat{\phi}-\phi_1)/(\Delta\phi) \text{ and } y=(\hat{\lambda}-\lambda_1)/(\Delta\lambda).$$

Additionally, the act of determining a period of at least one hazard curve, further comprises an act of determining periods of two hazard curves, referred to as bounding periods, $T_1$, $T_2 \in \{T_r\}$, such that $T_1 < \hat{T} \leq T_2$, or $T_1 = \hat{T}$ if $\hat{T}$ is in $\{T_r\}$ and is equal to its minimum value, and $T_1$ is the maximum value of $\{T_r\}$ satisfying these conditions and $T_2$ is the minimum value of $\{T_r\}$ satisfying these conditions.

Furthermore, the acts of letting $s_{r,k}$ denote the $k^{th}$ value and adjusting $s_{r,k}$, $s_{r,k}$ is adjusted for each bounding grid point $o_j$ ($j=1, 2, 3, 4$) and bounding period $T_i$ ($i=1,2$) to account for site classification $\hat{c}$ and for damping ratio $\hat{\zeta}$, where s is seismic intensity and where adjusting $s_{r,k}$ is done by multiplying $s_{r,k}$ by a site-classification coefficient $F_c$ and a damping coefficient $F_\zeta$, where by denoting by $s_k$ the $k^{th}$ value of s at the same location and period after adjusting for site classification and damping ratio, $$G(s_k|o_j,c=\hat{c},T=T_i,\zeta=\hat{\zeta})=G(F_cF_\zeta s_{r,k}|o_j,c=c_r,T=T_i,\zeta=\zeta_r): k=1,2,\ldots n_s.$$

In yet another aspect, the act of determining $G_{i,j,NZ}$ further comprises acts of letting $G_{i,j,NZ}$ denote the damping- and site-class-adjusted mean exceedance frequency of $s_{NZ}$ given period $T_i$ and location $o_j$, and for $i=1,2$ and $j=1, 2, 3, 4$, interpolating each curve from "Act d" to determine $G_{i,j,NZ}$, with $G_{i,j,NZ}$ being calculated according to the following:

$$G_{i,j,NZ} = \exp\left(\ln G_{i,j,k} + \ln(G_{i,j,k+1}/G_{i,j,k})\frac{(s_{NZ}-s_{i,j,k})}{(s_{i,j,k+1}-s_{i,j,k})}\right).$$

Additionally, the act of calculating $G_{j,NZ}$ further comprises acts of letting $G_{j,NZ}$ denote the damping- and site-class-adjusted value of $G_{NZ}$ at the period of interest $\hat{T}$ and location $o_j$, and for $j=1, 2, 3, 4$, and calculating $G_{j,NZ}$ according to the following:

$$G_{j,NZ} = \exp\left(\ln G_{1,j,NZ} + \ln(G_{2,j,NZ}/G_{1,j,NZ})\frac{\ln(\hat{T}/T_1)}{\ln(T_2/T_1)}\right).$$

In another aspect, $G_{NZ}$ is calculated according to the following:

$$b_1 = G_{2,NZ} - G_{1,NZ}$$

$$b_2 = G_{3,NZ} - G_{1,NZ}$$

$$b_3 = G_{4,NZ} - G_{3,NZ} - G_{2,NZ} + G_{1,NZ}$$

$$b_4 = G_{1,NZ}$$

$$G_{NZ} = b_1 x^2 + b_2 y^2 + b_3 xy + b_4.$$

The present invention further comprises an act of calculating a site-classification coefficient $F_c$, including acts of:

letting $F_{a,c}$ and $F_{v,c}$ denote, respectively, the value of the site coefficients parameters $F_a$ and $F_v$ as defined by the American Society of Civil Engineers (ASCE) for site classification c and reference period $T_i$, where the values of $F_{a,c}$ and $F_{v,c}$ depend on s, and where $c_r$ denotes the reference site classification; and calculating $F_c$ according to one of the following:

$$F_c = \frac{F_{a,c}}{F_{a,cr}}, \text{ and } F_c = \frac{F_{v,c}}{F_{v,cr}}.$$

Additionally, in the act of calculating $F_c$, $F_c$ is calculated according to the following:
when $T_i \leq 0.3$ sec, or for $T_i = 0.5$ sec and $c\epsilon\{A, AB, B, BC\}$, $$F_c = \frac{F_{a,c}}{F_{a,cr}},$$

and when $T_i = 0.5$ sec and $c\epsilon\{C, CD, D, DE\}$, or for $T_i \geq 1.0$ sec, $$F_c = \frac{F_{v,c}}{F_{c,vr}},$$

where A, AB, B, BC, C, CD, D, DE represent site soil categories, relevant to amplification and de-amplification of ground shaking at a site, relative to how strongly the site would shake in the same earthquake if it had a different site soil category.

In yet another aspect, in the act of calculating site-classification coefficient $F_c$, linear interpolation is used to tabulate values of $F_a$ and of $F_v$ at s=0.00, 0.01, 0.02, ... 1.25 g, where g denotes a unit of gravity.

In yet another aspect, the present invention further comprises an act of calculating damping coefficient $F_\zeta$, including acts of:
- letting $B_{S,\zeta}$ and $B_{1,\zeta}$ denote, respectively, the value of the damping coefficients $B_S$ and $B_1$ as defined by ASCE for viscous damping ratio $\zeta$;
- letting $B_{S,\zeta r}$ and $B_{1,\zeta r}$ denote, respectively, the value of $B_{S,\zeta}$ and $B_{1,\zeta}$ for the reference damping ratio $\zeta_r$; and
- calculating $F_\zeta$ according to one of the following:

$$F_\zeta = \frac{B_{S,\zeta r}}{B_{S,\zeta}}, \text{ and } F_\zeta = \frac{B_{1,\zeta r}}{B_{1,\zeta}}.$$

Additionally, in the act of calculating damping coefficient $F_\zeta$, for $\zeta_r \leq 0.05$, $F_\zeta$ is calculated according to the following:
when $T_i \leq 0.3$ sec or for $T_i = 0.5$ sec and $c\epsilon\{A, AB, B, BC\}$, $$F_\zeta = \frac{B_{S,\zeta r}}{B_{S,\zeta}},$$

and when $T_i = 0.5$ sec and $c\epsilon\{C, CD, D, DE\}$, or for $T_i \geq 1.0$ sec, $$F_\zeta = \frac{B_{1,\zeta r}}{B_{1,\zeta}}.$$

The present invention further comprises an act of calculating an estimated annualized lost (EAL) according to the following, $$EAL = H \times PFL,$$

wherein H represents the site economic hazard parameter;
wherein PFL represents a probable frequent loss, mean loss conditioned on an occurrence of $s_{EBE}$; and
wherein $s_{EBE}$ represents a seismic intensity associated with an economic-basis-earthquake (EBE), whereby through calculating the EAL, the EAL can be used to manage seismic risk.

The present invention further comprises an act of estimating the PFL, the PFL representing a point on a mean seismic vulnerability function for a frequent shaking intensity.

Additionally, in the act of estimating PFL, PFL is estimated from a method selected from a group consisting of employing assembly-based vulnerability at intensity level $s_{EBE}$, employing linear assembly-based vulnerability at intensity level $s_{EBE}$, and employing expert opinion.

In yet another aspect, employing assembly-based vulnerability at intensity level $s_{EBE}$ further comprises acts of:
- selecting a ground-motion time history and creating a stochastic structural model;
- performing a non-linear time history structural analysis using the ground-motion time history and the structural model to determine structural response;
- assessing probabilistic damage via component fragility functions evaluated using results from the structural response;
- assessing loss via probabilistic construction cost-estimation and results of the assessed probabilistic damage; and
- repeating steps of selecting the ground-motion time history, creating the stochastic structural model, performing the non-linear structural analysis, assessing the probabilistic damage, assessing the loss to estimate a probability distribution of loss at $S_{EBE}$, and calculating the loss statistic PFL.

In yet another aspect, employing linear assembly-based vulnerability at intensity level $s_{EBE}$ further comprises acts of:
- defining a facility using a facility defining parameter, the facility defining parameter being selected from a group consisting of location, including latitude and longitude, site soils, substructure, and structural and, nonstructural components;
- using the defined facility to create an inventory of damageable assemblies and identifying each assembly's engineering demand parameter (EDP);
- determining the $s_{EBE}$;
- analyzing a structure by calculating a structural response to which each damageable assembly is subjected; and
- analyzing damage and loss estimates to calculate an expected total cost to repair the structure according to the following, $$PFL = (1 + \overline{C}_{OP}) \sum_{k=1}^{N} \overline{y}_k(x_k),$$

where subscript k refers to particular assemblies, N refers to a number of damageable assemblies, and $\overline{C}_{OP}$ refers to contractor's mean overhead-and-profit factor.

In yet another aspect, in the act of calculating a risk analysis parameter, the risk analysis parameter is $s_{EBE}$, where $s_{EBE}$ is the seismic intensity associated with an economic-basis earthquake, and wherein the act of calculating $s_{EBE}$ further comprises acts of:

a. calculating $G_{EBE}$, where $G_{EBE}$ is an average exceedance frequency of $s_{EBE}$, and where $s_{EBE}$ is the seismic intensity associated with an economic-basis earthquake;
b. identifying grid points closest to ô for location ô=($\hat{\phi}$, $\hat{\lambda}$), where $\hat{\phi}$ denotes a latitude designation and $\hat{\lambda}$ denotes a longitude designation, the grid points closest to ô being referred to as the bounding grid points $o_j$;
c. considering the period of interest $\hat{T}$, determining a period of at least one hazard curve, referred to as a bounding period $T_i$;
d. letting $s_{r,k}$ denote the $k^{th}$ value (k=1, 2, ... $n_s$) of $s_r$ in the hazard curve $G(s_r|o_j,c=c_r,T=T_i,\zeta=\zeta_r)$ and adjusting $s_{r,k}$ for each bounding grid point $o_j$ and bounding period $T_i$ to account for site classification ĉ and for damping ratio $\hat{\zeta}$, where s is seismic intensity and where adjusting $s_{r,k}$ is done by multiplying $s_{r,k}$ by a site-classification coefficient $F_c$ and a damping coefficient $F_\zeta$, where by denoting by $s_k$ the $k^{th}$ value of s at the same location and period after adjusting for site classification and damping ratio, $G(s_k|o_j,c=\hat{c},T=T_i,\zeta=\hat{\zeta})=G(F_cF_\zeta s_{r,k}|o_j,c=c_r,T=T_i, \zeta=\zeta_r): k=1, 2, \ldots n_s;$ e. calculating $s_{i,j,EBE}$, where $s_{i,j,EBE}$ denotes the damping- and site-class-adjusted value of $s_{EBE}$ for period $T_i$ and location $o_j$;
  calculating $s_{j,EBE}$, where $s_{j,EBE}$ denotes the damping- and site-class-adjusted value of $s_{EBE}$ at the period of interest $\hat{T}$ and location $o_j$;
f. calculating $s_{EBE}$, where $s_{EBE}$ denotes the damping- and site-class-adjusted value of $s_{EBE}$ at the period of interest $\hat{T}$ and location of interest ô, whereby through calculating $s_{EBE}$, a user may calculate an expected annualized loss (EAL) according to the following:

EAL=$H$×PFL, wherein PFL represents a probable frequent loss, mean loss conditioned on an occurrence of $s_{EBE}$.

Additionally, the act of calculating $s_{i,j,EBE}$ further comprises acts of letting $s_{i,j,k}$ denote the $k^{th}$ value of s of the damping- and site-class-adjusted hazard curve in "Act d" at period $T_i$ and location $o_j$, and denoting $G_{i,j,k}=G(s_k|o_j,c=c_j, T=T_i,\zeta=\hat{\zeta})$ from "Act d", and denoting by $s_{i,j,EBE}$ the damping- and site-class-adjusted value of $s_{EBE}$ for period $T_i$ and location $o_j$, and for i=1,2 and j=1, 2, 3, 4, interpolating each curve from "Act d" to determine $s_{i,j,EBE}$, where $s_{i,j,EBE}$ is calculated according to the following:

$$s_{i,j,EBE} = s_{i,j,k} + (s_{i,j,k+1} - s_{i,j,k})\frac{\ln(G_{EBE}/G_{i,j,k})}{\ln(G_{i,j,k+1}/G_{i,j,k})}.$$

$k: G_{i,j,k+1} < G_{EBE} \leq G_{i,j,k}$

Furthermore, the act of calculating $s_{j,EBE}$ further comprises acts of letting $s_{j,EBE}$ denote the damping- and site-class-adjusted value of $s_{EBE}$ at the period of interest $\hat{T}$ and location $o_j$, and for j=1, 2, 3, 4, calculating $s_{j,EBE}$ according to the following:

$$s_{j,EBE} = s_{1,j,EBE} + \ln(\hat{T}/T_1)\frac{(s_{2,j,EBE} - s_{1,j,EBE})}{\ln(T_2/T_1)}.$$

Finally, the act of calculating $s_{EBE}$ further comprises acts of letting $s_{EBE}$ denote the damping- and site-class-adjusted value of $s_{EBE}$ at the period of interest $\hat{T}$ and location of interest ô, and calculating $s_{EBE}$ according to the following:

$a_1 = s_{2,EBE} - s_{1,EBE}$ $a_2 = s_{3,EBE} - s_{1,EBE}$ $a_3 = s_{4,EBE} - s_{3,EBE} - s_{2,EBE} + s_{1,EBE}$ $a_4 = s_{1,EBE}$ $s_{EBE} = a_1 x^2 + a_2 y^2 + a_3 xy + a_4.$

As can be appreciated by one in the art, the present invention is not limited to a method, but can also be incorporated into other aspects such as a data processing system and a computer program product. Other aspects can be configured to be used on a personal computer, to be Internet-accessible, and to perform all of the acts and operations of the method described herein.

BRIEF DESCRIPTION OF THE DRAWINGS

The objects, features and advantages of the present invention will be apparent from the following detailed descriptions of the preferred aspect of the invention in conjunction with reference to the following drawings where:
FIG. 1 is a table illustrating site-classification coefficient $F_a$;
FIG. 2 is a table illustrating site-classification coefficient $F_v$;
FIG. 3 is a table illustrating $B_S$ and $B_1$ as defined by the American Society of Civil Engineers (ASCE, 2000)

DETAILED DESCRIPTION

Figure 4:
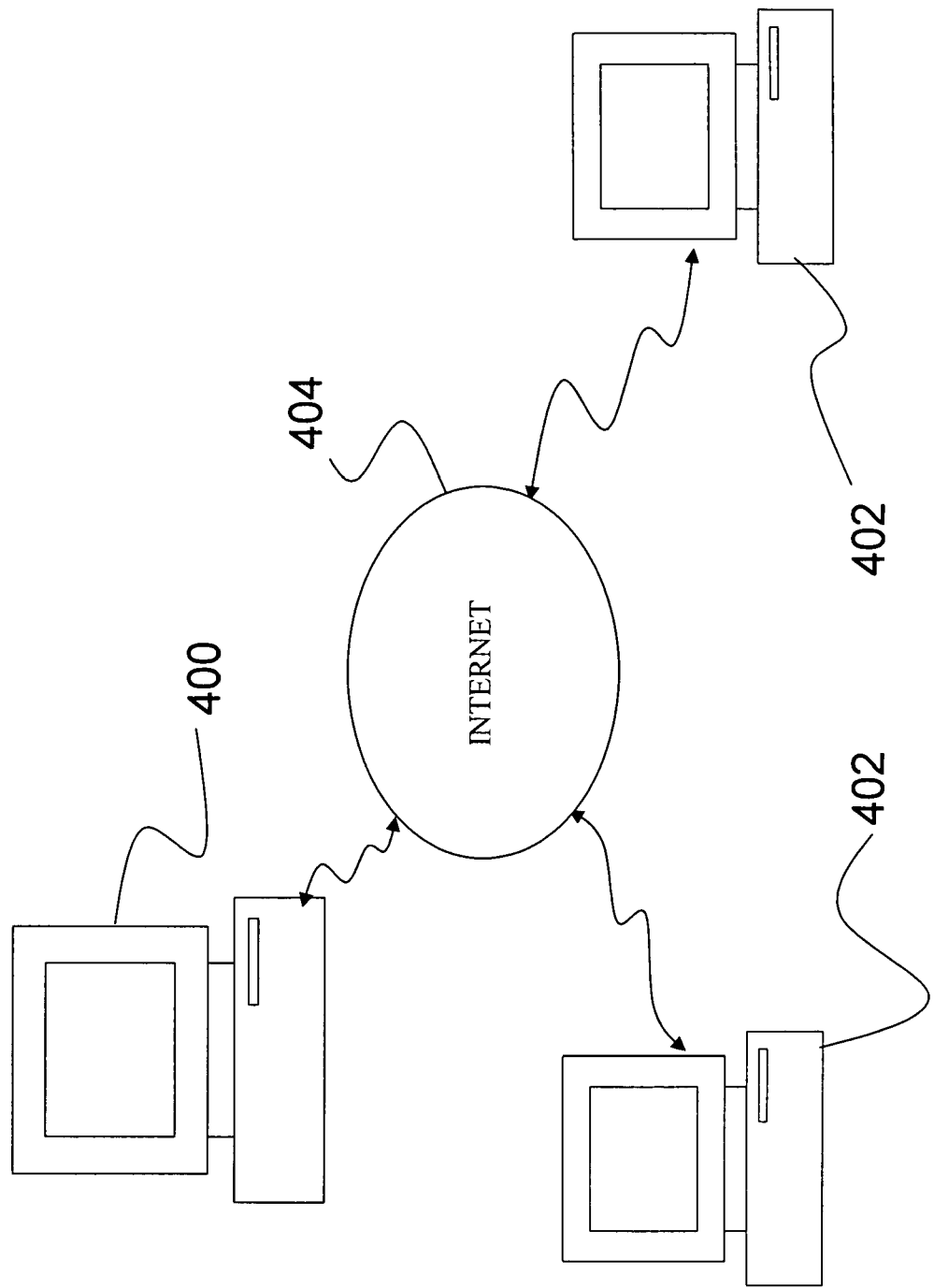
FIG. 4 is an illustration depicting an Internet-based system for risk management according to the present invention.

The present invention relates to risk management. More specifically, the present invention relates to a method, computer program product, and system for employing readily available, hazard data to estimate an expected repair cost for use in risk management, such as in seismic risk management.

The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. For example, the use of specific numerical values can be altered in some circumstances to achieve the desired result. Furthermore, it should be noted that unless explicitly stated otherwise, the FIGs. included herein are illustrated diagrammatically and without any specific scale, as they are provided as qualitative illustrations of the concept of the present invention.

In order to provide a working frame of reference, first a list of abbreviations is provided as a quick reference provided for the reader. Second, a glossary of terms used in the description and claims is provided. Next, a discussion of various principal aspects of the present invention is provided. Fourth, an introduction is presented to provide the reader with a general understanding of the present invention. Fifth, a discussion is provided to give an understanding of the specific details of the present invention. Finally, a conclusion is provided to summarize key aspects of the present invention.

(1) ABBREVIATIONS

A site classification defined by the American Society of Civil Engineers (ASCE) (2000);
AB site class averaged from adjacent site classes as defined by ASCE (2000) (i.e., classes A and B);
ABV assembly-based vulnerability;
B site classification defined by ASCE (2000);
BC site class averaged from adjacent site classes as defined by ASCE (2000) (i.e., classes B and C);
$B_S$ damping coefficient as defined by ASCE (2000), related to damped elastic spectral acceleration response in the acceleration-controlled portion of the response spectrum;
$B_1$ damping coefficient as defined by ASCE (2000), related to damped elastic spectral acceleration response in the velocity-controlled portion of the response spectrum;
C site classification defined by ASCE (2000);
CD site class averaged from adjacent site classes as defined by ASCE (2000) (i.e., classes C and D);
$c_d$ mean cost to repair one unit of an assembly from damage state d;
$C_{OP}$ factor applied to total direct construction cost to account for contractor overhead and profit;
$c_r$ reference site classification used in the gridded hazard database;
ĉ site classification defined according to ASCE (2000), and reflects geological characteristics (including the average shearwave velocity) of the top 30 meters of soil at the facility in question;
D site classification defined by ASCE (2000);
d particular value of damage state;
D uncertain damage state;
DE site class averaged from adjacent site classes as defined by ASCE (2000) (i.e., classes D and E);
DBE design-basis earthquake;
EAL expected annualized loss, units in money/time (e.g. dollars/year);
E site classification defined by ASCE (2000);
EBE economic-basis earthquake;
EDP engineering demand parameter;
FEMA Federal Emergency Management Agency;
$F_X(x)$ cumulative distribution function of a generic uncertain variable X evaluated at a particular value of that variable, denoted by x;
$F_a$ a site coefficient defined by ASCE (2000), related to the design short-period spectral response acceleration parameter;
$F_{a,c}$ value of the site coefficients parameter $F_a$ for site classification c and reference period $T_i$, where the value of $F_{a,c}$ depends on s;
$F_{a,cr}$ value of the site coefficients parameter $F_a$ for site classification $c_r$ and reference period $T_i$;
$F_c$ site-classification coefficient;
$F_v$ value of the site coefficients parameter $F_v$ from ASCE (2000), related to the design spectral response acceleration parameter at one-second;
$F_{v,c}$ value of the site coefficients parameter $F_v$ from ASCE (2000) for site classification c and reference period $T_i$;
$F_{v,cr}$ value of the site coefficients parameter $F_v$ ASCE (2000) for site classification $c_r$ and reference period $T_i$;
$F_\zeta$ damping coefficient;
G(s) mean annual frequency of exceeding s, units in 1/time;
G(s|Y) mean frequency with which shaking intensity s is exceeded, given condition(s) denoted by Y;
$G_{EBE}$ mean annual exceedance frequency of $S_{EBE}$, units in 1/time;
$G_{NZ}$ mean annual exceedance frequency of $S_{NZ}$, units in 1/time;
H hazard coefficient, units in 1/time;
h story height;
L modal excitation;
LABV linear assembly-based vulnerability;
m level or story in a facility;
$N_D$ number of possible damage states;
$n_s$ number of discrete points from the hazard curve shown in the gridded hazard data for any particular grid point and period;
ô location of a facility in question, denoted by longitude and latitude;
$p_{EBE}$ exceedance probability;
PFL probable frequent loss, units in money;
PML probable maximum loss, units in money;
r generally indicates a reference value;
s seismic intensity, units vary depending on selection of s. As an illustration, units for the damped elastic spectral acceleration are in distance/time$^2$ (e.g., ft/sec$^2$);
$S_a$ spectral acceleration;
$s_r$ vector of intensity values in the hazard curve for a particular grid point and period in the gridded hazard data;
$s_{r,k}$ $k^{th}$ value (k=1, 2, ... $n_s$) of $s_r$;
$S_{EBE}$ seismic intensity associated with the economic-basis earthquake;
$S_{NZ}$ seismic intensity associated with initiation of loss;
T period of vibration;
T̂ estimated small-amplitude fundamental period of vibration of a facility in question;
$T_r$ reference period of vibration appearing in the gridded hazard data;
$T_1$ largest value of $T_r$ that is less than or equal to T̂;
$T_2$ smallest value of $T_r$ that is greater than T̂;
$t_{EBE}$ planning period;
x angular distance in longitude between the site in question and the nearest grid point whose longitude is less than or equal to that of the site in question, divided by the longitudinal spacing between grid points;
x̂ the median value of a generic uncertain variable X;
$X_d$ threshold level of EDP causing a assembly to reach or exceed damage state d;
y angular distance in latitude between the site in question and the nearest grid point whose latitude is less than or equal to that of the site in question, divided by the latitude spacing between grid points;
ȳ(x) mean cost to repair a damaged assembly;
$\psi_1$ fundamental mode-shape vector;
$\omega_1$ fundamental frequency of vibration;
ζ damping ratio;
$\phi_r$ a longitude designation in a map grid point;
$\lambda_r$ a latitude designation in a map grid point;
ζ̂ damping ratio, a mathematical characteristic of the idealized structural system of the facility in question;
Φ( ) cumulative standard normal distribution evaluated at the term in parentheses; and β the logarithmic standard deviation of a generic uncertain variable X, i.e., the standard deviation of the natural logarithm of X.

(2) GLOSSARY

The purpose of this glossary is to provide a working frame of reference regarding some of the terms used in the description and claims. The glossary is intended to provide the reader with a general understanding of various terms as they are used in this disclosure, and is not intended to limit the scope of these terms. Rather, the scope of the terms is intended to be construed with reference to this disclosure as a whole and with respect to the claims below. The definitions provided should not be considered limiting to the extent that the terms are known in the art.

Assembly—The term "assembly" refers to a collection of one or more basic building components, assembled in place, and defined according to a standard taxonomic system that is based here on the assembly-numbering system of RS Means, located at 63 Smiths Lane, P.O. Box 800, Kingston, Mass., 02364, United States, extended to account for details of seismic resistance.

Economic-Basis Earthquake—The term "economic-basis earthquake" refers to an event that produces a site shaking with a stated exceedance probability during a stated number of years. As a non-limiting example, the stated exceedance probability is approximately 10% and the stated number of years is approximately 5 years.

Expected Annualized Loss—The term "expected annualized loss" (EAL) refers to an average yearly amount of loss when accounting for the frequency and severity of various levels of loss.

Facility—The term "facility" refers to a building, bridge, or other system comprising a combination of civil, structural, architectural, mechanical, electrical, and/or plumbing components, and can also include furnishings, fixtures, and equipment.

Means—The term "means" as used with respect to this invention generally indicates a set of operations to be performed on a computer, and may represent pieces of a whole program or individual, separable, software modules. Non-limiting examples of "means" include computer program code (source or object code) and "hard-coded" electronics (i.e. computer operations coded into a computer chip). The "means" may be stored in the memory of a computer or on a computer readable medium such as a floppy disk, a CD-ROM, and a flash drive.

Probable Frequent Loss—The term "probable frequent loss" (PFL) refers to the expected value of loss conditioned on the occurrence of an economic-basis earthquake.

Probable Maximum Loss—The term "probable maximum loss" (PML) commonly refers to the mean loss or the $90^{th}$ percentile of loss given the occurrence of what building codes until recently called the design basis earthquake.

Structure—The term "structure" refers to (1) a system of components in a facility that provide the facility's resistance to loads and deformations, e.g., the facility's beams, columns, floor diaphragms, shearwalls, braces, and connections; or (2) synonym for facility.

(3) PRINCIPAL ASPECTS

The present invention has three "principal" aspects. The first is a method for seismic risk management where the method typically operates on a computer system. The second principal aspect is a system for seismic risk management, typically in the form of software and/or manual operations, operated using a data processing system (computer). The third principal aspect is a computer program product. The computer program product generally represents computer-readable code (either source or object code) stored on a computer-readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. These aspects will be described in more detail below.

(4) INTRODUCTION

The present invention includes a method, computer program product, and system for risk management using readily available, gridded hazard data. Although for illustrative purposes the invention described herein largely uses language discussing seismic events and seismic risks, the invention is not limited thereto. The method of the present invention can be applied to risk management for structures exposed to any extraordinary event, non-limiting examples of which include an event such as an earthquake, floods, wind, and blast pressure.

A simplified second-generation performance-based earthquake engineering (PBEE) methodology can be used to estimate two important measures of seismic risk for use in standard financial analyses of real-estate investment opportunities. One is a scenario loss measure called the probable frequent loss (PFL), which is a practical measure of seismic risk that an investor can use in the sensitivity-study portion of his or her financial analysis of a property. The second is expected annualized loss (EAL), which can be reflected in the financial analysis as an operating expense (reflecting amortized seismic risk), and which is approximately proportional to PFL through a constant called the economic hazard coefficient, H. An algorithm is presented here for calculating H and the scenario shaking intensity on which PFL is conditioned, using readily available, U.S. Geological Survey (USGS)-produced hazard data and standard adjustments to account for building location, site soil, damping ratio, and fundamental period. The algorithm is implemented in a database application (and/or software) and the resulting data can be accessed via the Internet (and/or on a user's own computer). The ability to look up H on the Internet (or purchase a software product configured to provide H) and provide a user (e.g., a client) with PFL and EAL could represent a valuable new service to be offered by engineering consultants.

In patent application number 10/862,185 (which is incorporated herein by reference as though fully set forth herein), the Applicant disclosed the methodology for calculating PFL and EAL, given $s_{NZ}$, $G_{NZ}$, $s_{EBE}$, and $G_{EBE}$. The present invention expands upon the prior art by disclosing a methodology to calculate $G_{NZ}$, $s_{EBE}$, $G_{EBE}$ and H.

(5) DESCRIPTION OF SPECIFIC EMBODIMENTS

The present application discloses a method for employing readily available, gridded hazard data to calculate $G_{NZ}$, $s_{EBE}$, $G_{EBE}$ and H for any geographic location and fundamental period (T) within the boundaries of the gridded data. $G_{NZ}$, $s_{EBE}$, $G_{EBE}$, and H are utilized as follows:

$$EAL \approx H \cdot PFL, \qquad (3)$$

where $$H \equiv \frac{G_{NZ}}{\ln(G_{NZ}/G_{EBE})}, \quad (4)$$

in which EAL is defined as the expected annualized value of repair cost to a particular facility in a particular location and H is referred to as the site economic hazard coefficient. The PFL is a scenario loss estimate: the estimated mean facility repair cost conditioned on the occurrence of shaking in the economic-basis event, EBE. The EBE is defined as the event producing site shaking with 10% probability of exceedance in 5 years (Compare with the design-basis earthquake, DBE, whose shaking intensity has 10% exceedance probability in 50 yrs.). The site shaking intensity of the EBE is denoted by $s_{EBE}$. $G_{EBE}$ is the mean exceedance frequency at that site of the shaking intensity $s_{EBE}$. $G_{NZ}$ refers to the mean exceedance frequency of the lowest shaking intensity $s_{NZ}$ that would produce a nonnegligible repair cost.

The methodology disclosed herein accounts for period, damping ratio, and site soils using standard American Society of Civil Engineers (ASCE (2000)) adjustments, and geographically interpolates between adjacent grid points to provide the output parameters at the location of interest. ASCE world headquarters are located at 1801 Alexander Bell Drive, Reston, Va. 20191-4400, U.S.A. Although values are taken from ASCE (2000) and used as a reference, it should be clear that other equivalent values from other time periods and other organizations can be used. As can be appreciated by one skilled in the art, the ASCE (2000) values are used for convenience and clarity and are not intended to be limited thereto.

"Gridded hazard data" is sets of mean exceedance frequencies $G(s_r|\phi_r, \lambda_r, c_r, T_r, \zeta_r)$, where $G(s|Y)$ denotes the mean frequency with which shaking intensity s is exceeded, given condition(s) denoted by Y. In the present invention, it is assumed that intensity s is measured in terms of a parameter that can depend on fundamental period T and damping ratio $\zeta$ such as damped elastic spectral acceleration. The gridded hazard data present G at a set of discrete values of $s_r$; the set is denoted here by $\{s_r\}$. It is assumed that the data are available at locations $(\phi_r, \lambda_r) \in \{(\phi_r, \lambda_r)\}$, i.e., at a set of reference (longitude, latitude) map grid points with grid spacing $\Delta\phi$ and $\Delta\lambda$. The data are presented for a reference site classification $c_r$. Period is available at a set of reference values $T_r \in \{T_r\}$ and at one reference value of damping ratio $\zeta_r$.

The U.S. Geological Survey (USGS) has produced the relevant data. The USGS presents mean seismic hazard curves for the U.S., with $\Delta\phi=\Delta\lambda=0.05°$ for California and Nevada, and $\Delta\phi=\Delta\lambda=0.10°$ for the rest of the U.S.; for $c_r$ at the boundary between National Earthquake Hazards Reduction Program (NEHRP) site classifications B and C; and for $\{T_r\}=\{0.0, 0.1, 0.2, 0.3, 0.5, 1.0, 2.0 \text{ sec}\}$. In that database, $\{s_r\}$ contains $n_s$ values of s, where $n_s$ is either 18, 19, or 20, depending on $T_r$; and $\zeta_r=5\%$ of critical viscous damping. Although the present methodology is illustrated using these specifics and for locations within California, it does not depend on them, only on the general meaning of gridded hazard data as defined above.

(5.1) Methodology for Calculating $G_{NZ}$, $s_{EBE}$, $G_{EBE}$ and H

Act 1: Query the user for at least one of the following input parameters: location $\hat{o}=(\hat{\phi},\hat{\lambda})$, site classification $\hat{c}$, period of interest $\hat{T}$, damping ratio $\hat{\zeta}$, loss-threshold shaking $s_{NZ}$, planning period $t_{EBE}$, and exceedance probability $p_{EBE}$. Although some users may possess information pertaining to all of the input parameters, default values can be offered. (i.e., $\hat{\zeta}=0.05$, $t_{EBE}=5$ yr and $p_{EBE}=0.10$).

Act 2: Calculate $G_{EBE}$ based on $t_{EBE}$ and $p_{EBE}$ assuming Poisson earthquake arrivals:

$$G_{EBE}=-\ln(1-p_{EBE})/t_{EBE} \quad (5)$$

Please note, the calculation of $G_{EBE}$ is a function of user selected $t_{EBE}$ and $p_{EBE}$, which assumes Poisson arrivals. If $G_{EBE}$ is readily available, a user could select $G_{EBE}$ directly, making Poison earthquake occurrences irrelevant.

Act 3: For location $\hat{o}=(\hat{\phi},\hat{\lambda})$, find the four grid points closest to $\hat{o}$. The four grid points closest to $\hat{o}$ are referred to as the bounding grid points $o_1=(\phi_1, \lambda_1)$, $o_2=(\phi_1+\Delta\phi, \lambda_1)$, $o_3=(\phi_1, \lambda_1+\Delta\lambda)$ and $o_4=(\phi_1+\Delta\phi,\lambda_1\Delta\lambda)\}$. $o_1, o_2, o_3, o_4 \in \{(\phi_r, \lambda_r)\}$ such that $\phi_{min} \leq \phi_1 < \hat{\phi} \leq \phi_1+\Delta\phi \leq \phi_{max}$ and $\lambda_{min} \leq \lambda_1 < \hat{\lambda} \leq \lambda_1+\Delta\lambda \leq \lambda_{max}$. Calculate $x=(\hat{\phi}-\phi_1)/(\Delta\phi)$ and $y=(\hat{\lambda}-\lambda_1)/(\Delta\lambda)$.

Act 4: Considering the period of interest $\hat{T}$, determine the periods of the two hazard curves, referred to as the bounding periods, $T_1, T_2 \in \{T_r\}$ such that $T_1$ is the largest value in $\{T_r\}$ meeting the condition $T_1 < \hat{T}$, and $T_2$ is the smallest value in $\{T_r\}$ meeting the condition $\hat{T} \leq T_2$. If $\hat{T}$ is a member of $\{T_r\}$ and equal to its minimum value, then $T_1=\hat{T}$, and $T_2$ is the next larger value in $\{T_r\}$.

Act 5: Let $s_{r,k}$ denote the $k^{th}$ value ($k=1, 2, \ldots n_s$) of $s_r$ in the hazard curve $G(s_r|o_j,c=c_r,T=T_i,\zeta=\zeta_r)$ and adjust $s_{r,k}$ for each bounding grid point $o_j$ ($j=1, 2, 3, 4$) and bounding period $T_i$ ($i=1,2$) to account for site classification $\hat{c}$ and for damping ratio $\hat{\zeta}$. Adjusting $s_{r,k}$ is done by multiplying $s_{r,k}$ by the site-classification coefficient $F_c$ and the damping coefficient $F_\zeta$. Both coefficients are detailed below. Thus, denoting by $s_k$ the $k^{th}$ value of s at the same location and period after adjusting for site classification and damping ratio, $$G(s_k|o_j,c=\hat{c},T=T_i,\zeta=\hat{\zeta})=G(F_cF_\zeta s_{r,k}|o_j,c=c_r,T=T_i,\zeta=\zeta_r):$$
$$k=1, 2, \ldots n_s, \quad (6)$$

Act 6: Let $s_{i,j,k}$ denote the $k^{th}$ value of s of the damping- and site-class-adjusted hazard curve produced in Act 5 at period $T_i$ and location $o_j$. Denote $G_{i,j,k}=G(s_k|o_j,c=c_r,T=T_i,\zeta=\hat{\zeta})$ from Act 5. Denote by $s_{i,j,EBE}$ the damping- and site-class-adjusted value of $s_{EBE}$ for period $T_i$ and location $o_j$. For $i=1,2$ and $j=1, 2, 3, 4$, interpolate each curve from Act 5 to determine $s_{i,j,EBE}$:

$$s_{i,j,EBE} = s_{i,j,k} + (s_{i,j,k+1} - s_{i,j,k})\frac{\ln(G_{EBE}/G_{i,j,k})}{\ln(G_{i,j,k+1}/G_{i,j,k})} \quad (7)$$

$$k: G_{i,j,k+1} < G_{EBE} \leq G_{i,j,k}$$

Act 7: Let $s_{j,EBE}$ denote the damping- and site-class-adjusted value of $s_{EBE}$ at the period of interest $\hat{T}$ and location $o_j$. For $j=1, 2, 3, 4$, calculate $s_{j,EBE}$ by:

$$s_{j,EBE} = s_{1,j,EBE} + \ln(\hat{T}/T_1)\frac{(s_{2,j,EBE} - s_{1,j,EBE})}{\ln(T_2/T_1)} \quad (8)$$

Act 8: Let $s_{EBE}$ denote the damping- and site-class-adjusted value of $s_{EBE}$ at the period of interest $\hat{T}$ and location of interest $\hat{o}$. Calculate:

$$a_1=s_{2,EBE}-s_{1,EBE}$$

$$a_2=s_{3,EBE}-s_{1,EBE}$$

$$a_3=s_{4,EBE}-s_{3,EBE}-s_{2,EBE}+s_{1,EBE}$$

$$a_4=s_{1,EBE}$$

$$s_{EBE}=a_1x^2+a_2y^2+a_3xy+a_4 \quad (9)$$

Act 9: Let $G_{i,j,NZ}$ denote the damping- and site-class-adjusted mean exceedance frequency of $s_{NZ}$ given period $T_i$ and location $o_j$. For i=1,2 and j=1, 2, 3, 4, interpolate each curve from Act 5 to determine $G_{i,j,NZ}$.

$$G_{i,j,NZ} = \exp\left(\ln G_{i,j,k} + \ln(G_{i,j,k+1}/G_{i,j,k})\frac{(s_{NZ}-s_{i,j,k})}{(s_{i,j,k+1}-s_{i,j,k})}\right) \quad (10)$$

$$k: s_{i,j,k} < s_{NZ} \leq s_{i,j,k+1}$$

Act 10: Let $G_{j,NZ}$ denote the damping- and site-class-adjusted value of $G_{NZ}$ at the period of interest $\hat{T}$ and location $o_j$. For j=1, 2, 3, 4, calculate $G_{j,NZ}$ by:

$$G_{j,NZ} = \exp\left(\ln G_{1,j,NZ} + \ln(G_{2,j,NZ}/G_{1,j,NZ})\frac{\ln(\hat{T}/T_1)}{\ln(T_2/T_1)}\right) \quad (11)$$

Act 11: Let $G_{NZ}$ denote the damping- and site-class-adjusted value of $G_{NZ}$ at the period of interest $\hat{T}$ and location of interest $\hat{o}$. Calculate:

$b_1 = G_{2,NZ} - G_{1,NZ}$ $b_2 = G_{3,NZ} - G_{1,NZ}$ $b_3 = G_{4,NZ} - G_{3,NZ} - G_{2,NZ} + G_{1,NZ}$ $b_4 = G_{1,NZ}$ $G_{NZ} = b_1 x^2 + b_2 y^2 + b_3 xy + b_4.$ \quad (12)

Act 12: Calculate hazard coefficient H according to the following:

$$H \equiv \frac{G_{NZ}}{\ln(G_{NZ}/G_{EBE})}.$$

Act 13: Return $s_{EBE}$ and H to the user, where through H, the user may then easily calculate EAL.

(5.2) Site Soil Classification Coefficient $F_c$

Act 5 in the foregoing methodology discusses an adjustment to account for site soil classification $F_c$. In making the adjustment, let $F_{a,c}$ and $F_{v,c}$ denote, respectively, the value of the site coefficients parameters $F_a$ and $F_v$ from ASCE (2000) for site classification c and reference period $T_i$. The values of $F_{a,c}$ and $F_{v,c}$ depend on s. The ASCE (2000) values of $F_a$ and $F_v$ are duplicated for illustrative purposes in Table 1 and Table 2, using linear interpolation between values of s. The values were provided by ASCE, 2000, FEMA-356: Prestandard and Commentary for the Seismic Rehabilitation of Buildings, Washington, D.C., 490 pp. In the tables, values for site classifications A, B, C, D, and E are as shown in ASCE (2000); values for site classes AB, BC, CD, and DE are averaged from adjacent site classes.

Recall that $c_r$ denotes the reference site classification. Note that spectral acceleration is generally in the acceleration-controlled region of the response spectrum for period $T \leq 0.3$ sec, and in the velocity-controlled region for periods $T \geq 1.0$ sec, and will tend to be in the former region for firm sites and the latter for soft sites at T=0.5 sec. Then:

$$F_c = \frac{F_{a,c}}{F_{a,cr}}, \quad (13)$$

for $T_i \leq 0.3$ sec or for $T_i = 0.5$ sec and $c \in \{A, AB, B, BC\}$. For $T_i = 0.5$ sec and $c \in \{C, CD, D, DE\}$, or for $T_i \geq 1.0$ sec, $$F_c = \frac{F_{v,c}}{F_{v,cr}}. \quad (14)$$

For convenience, when implementing $F_a$ and $F_v$ in a database, one can use linear interpolation to tabulate values of $F_a$ and of $F_v$ at s=0.00, 0.01, 0.02, . . . 1.25 g. When required for a particular value of s and c, one rounds s to the nearest tabulated value and uses the associated value of $F_a$ or $F_v$.

(5.3) Damping Coefficient $F_\zeta$

Act 5 in the foregoing methodology mentions an adjustment to account for damping ratio. In that adjustment, let $B_{S,\zeta}$ and $B_{1,\zeta}$ denote, respectively, the value of the damping coefficients $B_S$ and $B_1$ from ASCE (2000) (as illustrated in Table 3) for viscous damping ratio $\zeta$. Let $B_{S,\zeta r}$ and $B_{1,\zeta r}$ denote, respectively, the value of $B_{S,\zeta}$ and $B_{1,\zeta}$ for the reference damping ratio $\zeta_r$. Then for $\zeta_r \leq 0.05$, $F_\zeta$ is given by:

$$F_\zeta = \frac{B_{S,\zeta r}}{B_{S,\zeta}} \quad (15)$$

for $T_i \leq 0.3$ sec or for $T_i = 0.5$ sec and $c \in \{A, AB, B, BC\}$. For $T_i = 0.5$ sec and $c \in \{C, CD, D, DE\}$, or for $T_i \geq 1.0$ sec, $$F_\zeta = \frac{B_{1,\zeta r}}{B_{1,\zeta}} \quad (16)$$

(5.4) Methodology for Calculating PFL

Equation 3 still requires an estimate of PFL. Application '185 disclosed in detail various methods for estimating PFL. For reference and further clarification, the methods for estimating PFL will be discussed briefly herein. One method for estimating PFL is to perform an assembly-based vulnerability (ABV) analysis at the intensity level $S_{EBE}$, including selection of ground-motion time histories, non-linear time-history structural analysis, damage analysis, loss analysis, and simulation to account for uncertainties in ground motion, mass, damping, force-deformation behavior, component capacity, unit repair cost, and contractor overhead and profit. Another method entails employing en expert opinion in obtaining PFL.

In another approach referred to as linear ABV, the loss analysis can be further simplified by taking advantage of the fact that at low levels of intensity, around $S_{EBE}$, the structural response of the facility might be adequately modeled using linear spectral analysis, thus avoiding the time-consuming construction of a non-linear structural model. Furthermore, only mean loss at $S_{EBE}$ is required, not the damage and not an estimate of uncertainty, allowing avoidance of aspects of ABV that are intended to quantify damage and uncertainty.

(5.4.1) PFL and Linear ABV

A simplified approach called linear assembly-based vulnerability (LABV) can be used to calculate PFL and EAL. LABV includes the following four operations:

1. Facility definition. To define the facility an individual must know its location (latitude and longitude) and design, including site soils, substructure, structural and nonstructural components. The individual creates an inventory of the damageable assemblies and identifies the engineering demand parameter (EDP) (e.g., story drift ratio, member force, etc.) that would cause damage to each assembly.

2. Hazard analysis. The objective of this stage is to determine the $S_{EBE}$, that is, the intensity measure associated with 10% exceedance probability in 5 years. This might be parameterized via any one of several intensity measures. For present purposes, the 5%-damped elastic spectral acceleration response at the building's estimated small-amplitude fundamental period of vibration can be utilized. It can be calculated via software and adjusted to account for site classification such as by using $F_a$ or $F_v$, as appropriate, from the International Building Code (2000) provided by the International Code Council, located at 5203 Leesburg Pike, Suite 600, Falls Church, Va., 22041, United States.

3. Structural analysis. In this simplification, the structural response to which each damageable assembly is subjected is calculated considering the first-mode spectral response. The mode shape of a building at its small-amplitude fundamental period of vibration, $T_1$, is denoted by $\psi_1$. Let the modal excitation and modal mass for the first mode be denoted by $L_1$ and $M_1$, respectively. Each damageable assembly is assumed to be sensitive to an EDP, characteristic of that assembly type, with a value denoted by x, and which can be calculated as a function of $\psi_1$, $L_1$ and $M_1$. For example, considering one frame direction, the EDP for a segment of wallboard partition on the $m^{th}$ story would be the interstory drift along that wall line, estimated as $$x \approx \frac{S_{EBE}}{\omega_1^2}\left(\frac{\psi_{1(m+1)} - \psi_{1m}}{h_m}\right)\frac{L_1}{M_1}, \quad (17)$$

where $\omega_1 = 2\pi/T_1$, $\psi_{1m}$ refers to the component of the fundamental mode shape at floor m, and $h_m$ refers to the height of story m.

4. Damage and loss analysis. It is assumed that after an assembly is subjected to a certain EDP, it will be in an uncertain damage state D, indexed by d=0, 1, 2, ... $N_D$, where d=0 indicates the undamaged state. It is assumed that the damage states can be sorted in increasing order, either because an assembly in damage state d=i+1 must have passed through damage state i already, or because the effort to restore an assembly from damage state d=i+1 necessarily restores it from damage state d=i. The threshold level of EDP causing an assembly to reach or exceed damage state d is uncertain, and is denoted by $X_d$, with a cumulative distribution function denoted by $F_{X_d}(x)$. The expected value of the cost to restore a damaged assembly from damage state d is denoted by $c_d$; and can be calculated by standard construction-cost estimation principles. Then, given the response x to which an assembly is subjected, the mean cost to repair the damageable assembly is $$\bar{y}(x) = \sum_{d=1}^{N_D} c_d\, p[D = d \mid EDP = x], \quad (18)$$

where probability $$\begin{aligned} p[D = d \mid EDP = x] &= 1 - F_{X_1}(x) & d = 0 \\ &= F_{X_d}(x) - F_{X_{d-1}}(x) & 1 \le d < N_D, \\ &= F_{X_{N_D}}(x) & d = N_D \end{aligned} \quad (19)$$

and where d=0 refers to the undamaged state.

Equation (18) is normalized by the replacement cost of the assembly, and is referred to as a component damage function. The present invention uses the non-normalized form to avoid considering the uncertain replacement cost of the component. That is, because construction contractors estimate repair effort directly in terms of labor hours and dollar costs, it is less prone to error to deal with $c_d$ directly, rather than as a fraction of another cost that must also be estimated. Taking all capacities from Beck, J. L.; Porter, K. A.; Shaikhutdinov, R. V.; Au, S. K.; Moroi, T.; Tsukada, Y.; and Masuda, M., 2002, "Impact of Seismic Risk on Lifetime Property Values, Final Report," Consortium of Universities for Research in Earthquake Engineering, Richmond, Calif., United States, as log normally distributed, and using the median and logarithmic standard deviations shown there and in Porter, K. A.; Beck, J. L.; and Shaikhutdinov, R. V.; 2002a, "Sensitivity of building loss estimates to major uncertain variables," Earthquake Spectra, 18 (4), 719-743, so $$F_X(x) = \Phi\left(\frac{\ln(x/\hat{x})}{\beta}\right), \quad (20)$$

where $\hat{x}$ and $\beta$ vary by assembly type and damage state, and where $\Phi(\,)$ denotes the cumulative standard normal distribution evaluated at the term in parentheses. Introducing subscript k to index particular assemblies, the expected total cost to repair the facility with N damageable assemblies is given by $$PFL = (1 + \bar{C}_{OP})\sum_{k=1}^{N} \bar{y}_k(x_k), \quad (21)$$

where $\bar{C}_{OP}$ refers to contractor's mean overhead-and-profit factor (typically 15% to 20%). Then EAL is calculated using Equation 3.

(5.5) Database Implementation

The foregoing methodology was implemented in a Microsoft Access 2003 database, which contains all of the tables and queries necessary to perform the calculations shown above. The database uses the Frankel and Leyendecker gridded hazard data (i.e., Frankel, A. and E. V. Leyendecker, 2001, *Uniform Hazard Response Spectra and Seismic Hazard Curves for the United States*, CD-ROM, US Geological Survey, Menlo Park, Calif.) and was tested on the site shaking hazard for the case-study buildings discussed in application '185. Use of the database produced the same results as were produced manually in application '185.

Although the methodology was implemented in a Microsoft Access 2003 database, Access 2003 is not strictly required as any suitable database with table and query functions will work, non-limiting examples of which include Extensible Markup Language (XML), an international standard language for expressing table structure and contents, and Structured Query Language (SQL), an international standard query language. A macro that runs the queries in the desired order has been created in the form of Visual Basic source code. Access to the database could be readily offered via the Internet for low-cost, on-demand use by engineering consultants and others.

(5.6) Data Processing System

The present invention also comprises a system for risk management. Through use of a data processing system, the risk management method can be incorporated into a Website.

The Website allows users to access it over the Internet so that users can interact with the system or download a copy of a computer program product containing computer executable instructions for operating the method described herein. Alternatively, the system can be loaded onto a home computer or laptop computer where a user interacts with the computer to manage risk.

FIG. 4 illustrates a data processing system 400 (e.g., server computer) incorporating the operations of the method described above. The method utilizes the data processing system 400 for storing computer executable instructions as components for causing a processor to carry out the operations. The data processing system 400 may be accessible by a user's computer 402 over the Internet 404 through an Internet-accessing user interface (e.g., web page).

In another aspect, the computer executable instructions for causing a processor to carry out the operations of the method can be loaded onto the user's computer 402, personal digital assistant, or any other computing device. In this aspect, the user's computer 402 functions as the data processing system 400.

Figure 5:
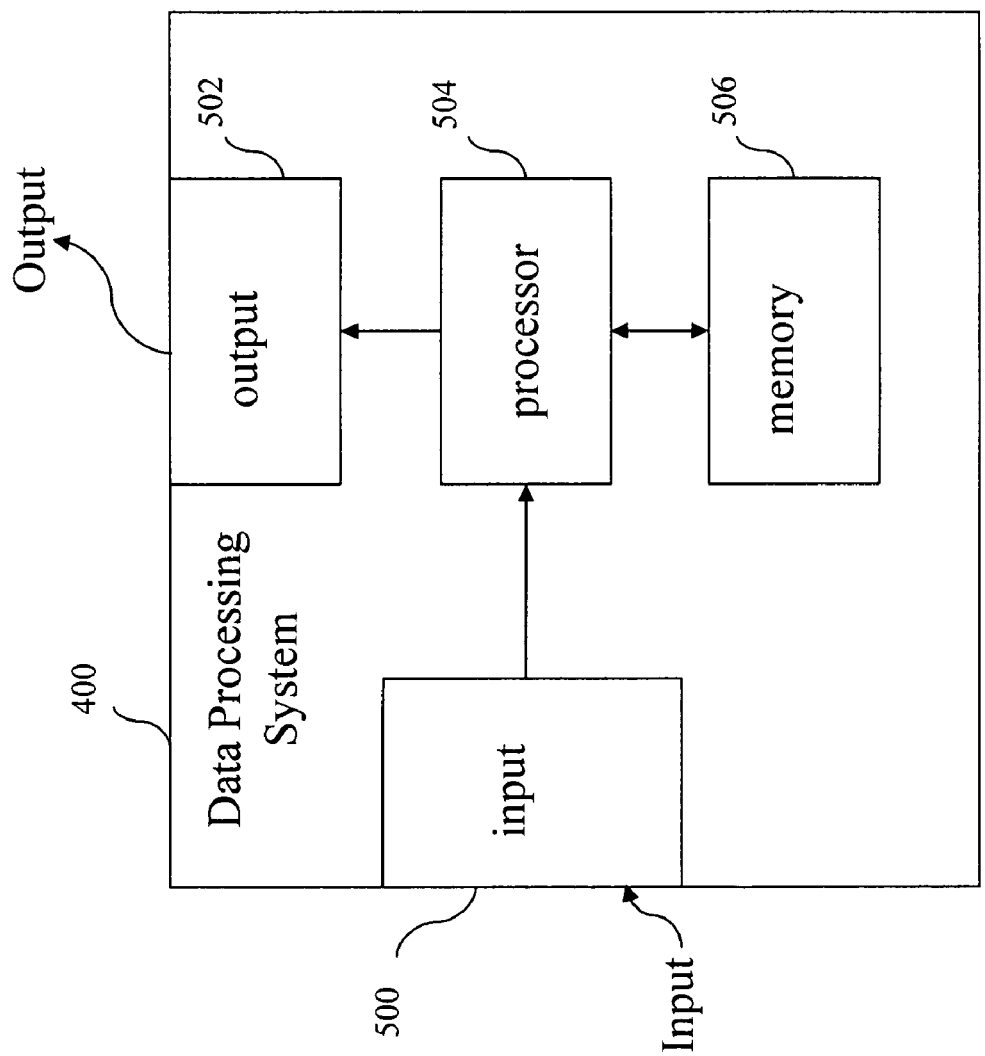
FIG. 5 is a block diagram of a general computer system for use with the present invention.

A block diagram depicting the components of the data processing system 400 used in the present invention is provided in FIG. 5. The data processing system 400 comprises an input 500 for receiving information from a user. Information received may include input from devices such as scanners, keypads, keyboards, microphone, other peripherals such as storage devices, other programs, etc. The input 500 may include multiple "ports." An output 502 is connected with the processor for providing information for transmission to other data processing systems, to storage devices, to display devices such as monitors, to generating information necessary for delivery, and to other mechanisms for presentation in user-readable forms. Output may also be provided to other devices or other programs, e.g., to other software modules, for use therein. The input 500 and the output 502 are both coupled with a processor 504, which may be a general-purpose computer processor or a specialized processor designed specifically for use with the present invention. The processor 504 is coupled with a memory 506 to permit storage of data and software to be manipulated by commands to the processor.

(5.7) Computer Program Product

Figure 6:
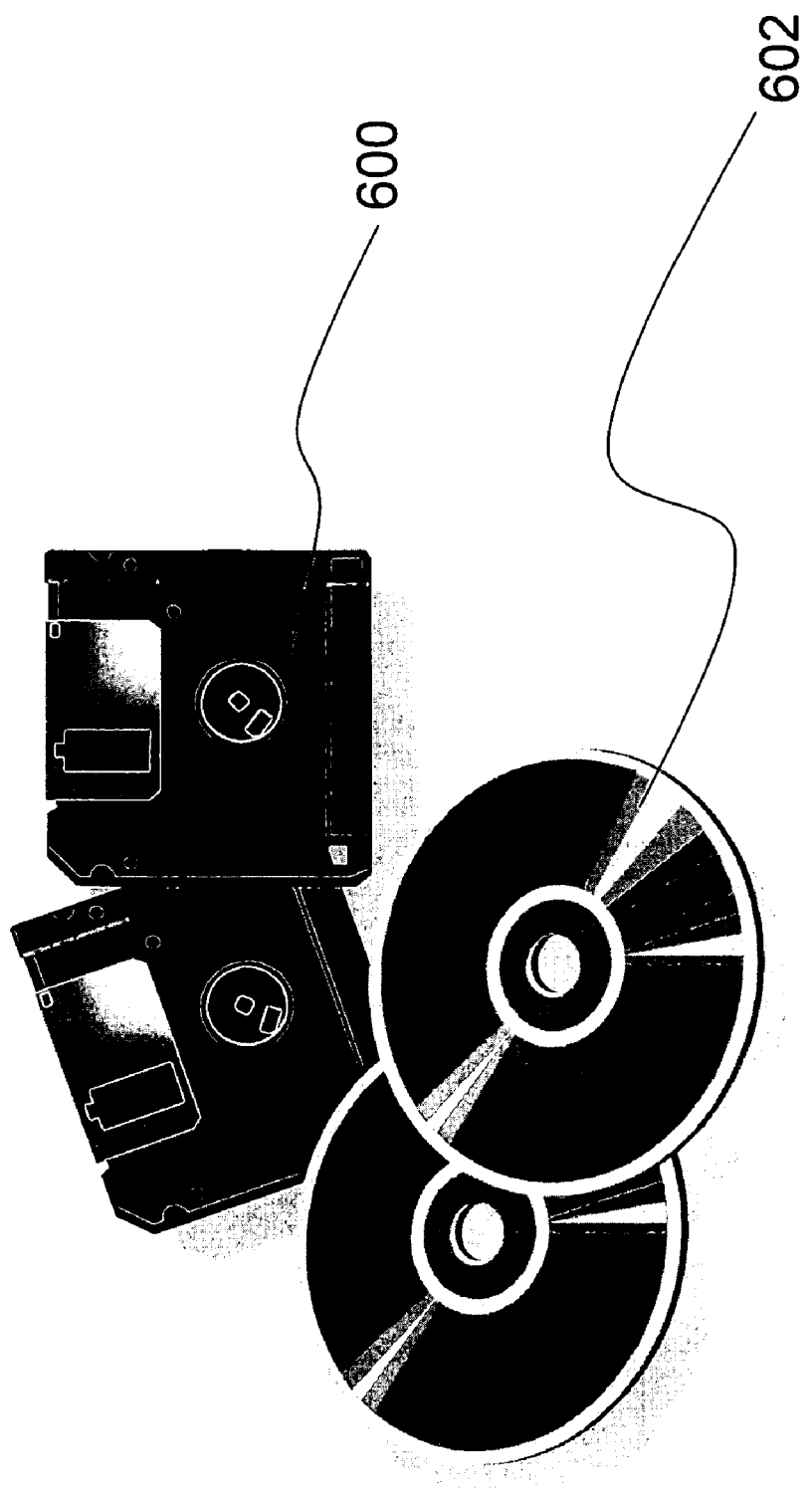
FIG. 6 is an illustrative diagram of a computer-readable medium aspect of the present invention.

An illustrative diagram of a computer program product embodying the present invention is depicted in FIG. 6. As a non-limiting example, the computer program product is depicted as either a floppy disk 600 or an optical disk 602. However, as mentioned previously, the computer program product generally represents computer-readable code stored on any compatible computer-readable medium for causing a processor to carry out the operations of the above described method.

(6) CONCLUSION

Previous work showed that two useful real-estate investment decision parameters, the probable frequent loss (PFL) and expected annualized loss (EAL) can be readily calculated by engineering consultants and employed by real-estate investors to reflect seismic risk in their financial analysis of an investment opportunity. The present application discloses how one can create a GIS database of the constant of proportionality, H, called the economic hazard coefficient, from readily available gridded hazard data produced by the U.S. Geological Survey. The database also includes the shaking intensity, $s_{EBE}$, needed for determining PFL. The database can be utilized by engineering consultants via the Internet, or on any other computer readable medium.

Finally, the present application discloses how formal decision analysis can be used in the investment decision process to account for real estate market risk, future earthquake losses, and the investor's risk attitude, and to choose among competing risk-management alternatives based on the maximum certainty equivalent. The decision-analysis approach requires the additional information of variance of market value and the decision-maker's risk tolerance. Variance of earthquake repair costs is not needed, since it makes a negligible contribution in the decision analysis compared with the uncertainty in market conditions.

What is claimed is:

1. A computer-implemented method for obtaining a seismic risk analysis, the method comprising an act of:
   causing a computer processor to execute instructions specifically encoded on a memory, such that upon execution, the computer processor performs operations of:
   a. receiving, by the computer processor, as input a planning period $t_{EBE}$, where the planning period is the period an investor uses in a financial analysis of an economic-basis earthquake for a particular facility;
   b. calculating, by the computer processor, a risk analysis parameter based upon the planning period $t_{EBE}$; and
   c. calculating, by the computer processor, an expected annualized loss (EAL) according to the following:

$$EAL = H \times PFL,$$

wherein PFL represents a probable frequent loss, an average loss conditioned on a seismic intensity associated with the economic-basis earthquake, and H represents an economic hazard coefficient; and
   d. determining, by the computer processor, the EAL in order to provide an expected annualized value of repair cost to the particular facility in a particular location;
   wherein in the act of calculating a risk analysis parameter, the risk analysis parameter is hazard coefficient H, and the act of calculating hazard coefficient H further comprising acts of:
   a. calculating $G_{EBE}$, where $G_{EBE}$ is an average exceedance frequency of $s_{EBE}$, and where $s_{EBE}$ is the seismic intensity associated with an economic-basis earthquake;
   b. identifying grid points closest to ô for location $\hat{o} = (\hat{\phi}, \hat{\lambda})$, where $\hat{\phi}$ denotes a latitude designation and $\hat{\lambda}$ denotes a longitude designation, the grid points closest to ô being referred to as the bounding grid points $o_j$;
   c. considering the period of interest $\hat{T}$, determining a period of at least one hazard curve, referred to as a bounding period $T_i$;
   d. letting $s_{r,k}$ denote the $k^{th}$ value (k=1, 2, ... $n_s$) of $s_r$ in the hazard curve $G(s_r|o_j, c=c_r, T=T_i, \zeta=\zeta_r)$ and adjusting $s_{r,k}$ for each bounding grid point $o_j$ and bounding period $T_i$ to account for site classification ĉ and for damping ratio $\hat{\zeta}$, where s is seismic intensity and where adjusting $s_{r,k}$ is done by multiplying $s_{r,k}$ by a site-classification coefficient $F_c$ and a damping coefficient $F_\zeta$, where by denoting by $s_k$ the $k^{th}$ value of s at the same location and period after adjusting for site classification and damping ratio, $$G(s_k|o_j, c=\hat{c}, T=T_i, \zeta=\hat{\zeta}) = G(F_c F_\zeta s_{r,k}|o_j, c=c_r, T=T_i, \zeta=\zeta_r); k=1, 2, \ldots n_s;$$

e. letting $G_{i,j,NZ}$ denote the damping- and site-class-adjusted average exceedance frequency of $s_{NZ}$ given period $T_i$ and location $o_j$, and for each $T_i$ and $o_j$, interpolating each curve from "Act d" to determine $G_{i,j,NZ}$;
   f. letting $G_{j,NZ}$ denote the damping- and site-class-adjusted value of $G_{NZ}$ at the period of interest $\hat{T}$ and location $o_j$, and for each j, calculating $G_{j,NZ}$;

23 g. letting $G_{NZ}$ denote the damping- and site-class-adjusted value of $G_{NZ}$ at the period of interest $\hat{T}$ and location of interest $\hat{o}$, and calculating $G_{NZ}$;

h. calculating risk analysis parameter H (i.e., hazard coefficient) according to the following:

$$H \equiv \frac{G_{NZ}}{\ln(G_{NZ}/G_{EBE})},$$

whereby through H, a user may calculate an expected annualized loss (EAL) according to the following:

EAL=$H$×PFL, wherein PFL represents a probable frequent loss, mean loss conditioned on an occurrence of $s_{EBE}$.

2. A method for obtaining a risk analysis parameter as set forth in claim 1, wherein the act of calculating $G_{EBE}$, $G_{EBE}$ is calculated based on $t_{EBE}$ and $p_{EBE}$ assuming Poisson earthquake arrivals according to the following:

$G_{EBE}$=−ln(1−$p_{EBE}$)/$t_{EBE}$, where $G_{EBE}$ is a mean annual exceedance frequency of $s_{EBE}$, where $s_{EBE}$ is the seismic intensity associated with an economic-basis earthquake, and where $p_{EBE}$ is the probability that earthquake shaking of intensity $s_{EBE}$ or greater will occur during planning period $t_{EBE}$.

3. A method for obtaining a risk analysis parameter as set forth in claim 1, wherein the act of identifying grid points closest $\hat{o}$ for location $\hat{o}=(\hat{\phi}, \hat{\lambda})$, further comprises acts of identifying four grid points closest to $\hat{o}$ for location $\hat{o}=(\hat{\phi},\hat{\lambda})$, where $\hat{\phi}$ denotes a latitude designation and $\hat{\lambda}$ denotes a longitude designation, the four grid points closest to $\hat{o}$ being referred to as the bounding grid points $o_1=(\phi_1, \lambda_1)$, $o_2=(\phi_1+\Delta\phi, \lambda_1)$, $o_3=(\phi_1, \lambda_1+\Delta\lambda)$ and $o_4=(\phi_1+\Delta\phi,\lambda_1+\Delta\lambda)\}$, where $o_1$, $o_2$, $o_3$, $o_4 \in \{(\phi_r, \lambda_r)\}$ such that $\phi_{min} \leq \phi_1 < \hat{\phi} \leq \phi_1+\Delta\phi \leq \phi_{max}$ and $\lambda_{min} \leq \lambda_1 < \hat{\lambda} \leq \lambda_1+\Delta\lambda \leq \lambda_{max}$, and calculating x and y according to the following:

$x=(\hat{\phi}-\phi_1)/(\Delta\phi)$ and $y=(\hat{\lambda}-\lambda_1)/(\Delta\lambda)$.

4. A method for obtaining a risk analysis parameter as set forth in claim 1, wherein the act of determining a period of at least one hazard curve, further comprises an act of determining periods of two hazard curves, referred to as bounding periods, $T_1$, $T_2 \in \{T_r\}$, such that $T_1 < \hat{T} \leq T_2$, or $T_1=\hat{T}$ if $\hat{T}$ is in $\{T_r\}$ and is equal to its minimum value, and $T_1$ is the maximum value of $\{T_r\}$ satisfying these conditions and $T_2$ is the minimum value of $\{T_r\}$ satisfying these conditions.

5. A system for obtaining a seismic risk analysis parameter, the system comprising:

a computer having a memory and a processor, the memory encoded with instructions for causing the computer to perform operations of:

a. receiving as input a planning period $t_{EBE}$, where the planning period is the period an investor uses in a financial analysis of an economic-basis earthquake for a particular facility;

b. calculating a risk analysis parameter based upon the planning period $t_{EBE}$;

c. calculating an expected annualized loss (EAL) according to the following:

EAL=$H$×PFL, wherein PFL represents a probable frequent loss, an average loss conditioned on a seismic intensity associated with the economic-basis earthquake, and H represents an economic hazard coefficient; and

24 d. determining the EAL in order to provide an expected annualized value of repair cost to a particular facility in the particular location;

wherein in the operation of calculating a risk analysis parameter, the risk analysis parameter is hazard coefficient H, and the operation of calculating hazard coefficient H further comprising operations of:

a. calculating $G_{EBE}$, where $G_{EBE}$ is an average exceedance frequency of $s_{EBE}$, and where $s_{EBE}$ is the seismic intensity associated with an economic-basis earthquake;

b. identifying grid points closest to $\hat{o}$ for location $\hat{o}=(\hat{\phi}, \hat{\lambda})$, where $\hat{\phi}$ denotes a latitude designation and $\hat{\lambda}$ denotes a longitude designation, the grid points closest to $\hat{o}$ being referred to as the bounding grid points $o_j$;

c. considering the period of interest $\hat{T}$, determining a period of at least one hazard curve, referred to as a bounding period $T_i$;

d. letting $s_{r,k}$ denote the $k^{th}$ value ($k=1, 2, \ldots n_s$) of $s_r$ in the hazard curve $G(s_r|o_j, c=c_r, T=T_i, \zeta=\zeta_r)$ and adjusting $s_{r,k}$ for each bounding grid point $o_j$ and bounding period $T_i$ to account for site classification $\hat{c}$ and for damping ratio $\hat{\zeta}$, where s is seismic intensity and where adjusting $s_{r,k}$ is done by multiplying $s_{r,k}$ by a site-classification coefficient $F_c$ and a damping coefficient $F_\zeta$, where by denoting by $s_k$ the $k^{th}$ value of s at the same location and period after adjusting for site classification and damping ratio, $G(s_k|o_j,c=\hat{c},T=T_i,\zeta=\hat{\zeta})=G(F_c F_\zeta s_{r,k}|o_j,c=c_r,T=T_i,\zeta=\zeta_r):k=1, 2, \ldots n_s$;

e. letting $G_{i,j,NZ}$ denote the damping- and site-class-adjusted average exceedance frequency of $s_{NZ}$ given period $T_i$ and location $o_j$, and for each $T_i$ and $o_j$, interpolating each curve from "Act d" to determine $G_{i,j,NZ}$;

f. letting $G_{j,NZ}$ denote the damping- and site-class-adjusted value of $G_{NZ}$ at the period of interest $\hat{T}$ and location $o_j$, and for each j, calculating $G_{j, NZ}$;

g. letting $G_{NZ}$ denote the damping- and site-class-adjusted value of $G_{NZ}$ at the period of interest $\hat{T}$ and location of interest $\hat{o}$, and calculating $G_{NZ}$;

h. calculating risk analysis parameter H (i.e., hazard coefficient) according to the following:

$$H \equiv \frac{G_{NZ}}{\ln(G_{NZ}/G_{EBE})},$$

whereby through H, a user may calculate an expected annualized loss (EAL) according to the following:

EAL=$H$×PFL, wherein PFL represents a probable frequent loss, mean loss conditioned on an occurrence of $s_{EBE}$.

6. A system for obtaining a risk analysis parameter as set forth in claim 5, wherein the operation of calculating $G_{EBE}$, $G_{EBE}$ is calculated based on $t_{EBE}$ and $p_{EBE}$ assuming Poisson earthquake arrivals according to the following:

$G_{EBE}$=−ln(1−$p_{EBE}$)/$t_{EBE}$, where $G_{EBE}$ is a mean annual exceedance frequency of $s_{EBE}$, where $s_{EBE}$ is the seismic intensity associated with an economic-basis earthquake, and where $p_{EBE}$ is the probability that earthquake shaking of intensity $s_{EBE}$ or greater will occur during planning period $t_{EBE}$.

7. A system for obtaining a risk analysis parameter as set forth in claim 5, wherein the operation of identifying grid points closest $\hat{o}$ for location $\hat{o}=(\hat{\phi}, \hat{\lambda})$, further comprises operations of identifying four grid points closest to $\hat{o}$ for location $\hat{o}=(\hat{\phi}, \hat{\lambda})$, where $\hat{\phi}$ denotes a latitude designation and $\hat{\lambda}$ denotes a longitude designation, the four grid points closest to ô being referred to as the bounding grid points $o_1=(\phi_1, \lambda_1)$, $o_2=(\phi_1+\Delta\phi, \lambda_1)$, $o_3=(\phi_1, \lambda_1+\Delta\lambda)$ and $o_4=(\phi_1+\Delta\phi, \lambda_1+\Delta\lambda)\}$, where $o_1, o_2, o_3, o_4 \in \{(\phi_r, \lambda_r)\}$ such that $\phi_{min} \leq \phi_1 < \hat{\phi} \leq \phi_1 + \Delta\phi \leq \phi_{max}$ and $\lambda_{min} \leq \lambda_1 < \hat{\lambda} \leq \lambda_1 + \Delta\lambda \leq \lambda_{max}$, and calculating x and y according to the following:

$$x=(\hat{\phi}-\phi_1)/(\Delta\phi) \text{ and } y=(\hat{\lambda}-\lambda_1)/(\Delta\lambda).$$

8. A system for obtaining a risk analysis parameter as set forth in claim 5, wherein the operation of determining a period of at least one hazard curve, further comprises an operation of determining periods of two hazard curves, referred to as bounding periods, $T_1, T_2 \in \{T_r\}$, such that $T_1 < \hat{T} \leq T_2$, or $T_1 = \hat{T}$ if $\hat{T}$ is in $\{T_r\}$ and is equal to its minimum value, and $T_1$ is the maximum value of $\{T_r\}$ satisfying these conditions and $T_2$ is the minimum value of $\{T_r\}$ satisfying these conditions.

9. A system for obtaining a risk analysis parameter as set forth in claim 5, wherein the operations of letting $s_{r,k}$ denote the $k^{th}$ value and adjusting $s_{r,k}$, $s_{r,k}$ is adjusted for each bounding grid point $o_j$ (j=1, 2, 3, 4) and bounding period $T_i$ (i=1,2) to account for site classification $\hat{c}$ and for damping ratio $\hat{\zeta}$, where s is seismic intensity and where adjusting $s_{r,k}$ is done by multiplying $s_{r,k}$ by a site-classification coefficient $F_{\hat{c}}$ and a damping coefficient $F_{\hat{\zeta}}$, where by denoting by $s_k$ the $k^{th}$ value of s at the same location and period after adjusting for site classification and damping ratio, $$G(s_k|o_j,c=\hat{c},T=T_i,\zeta=\hat{\zeta})=G(F_c F_\zeta s_{r,k}|o_j,c=c_r,T=T_i,\zeta=\zeta_r):k=1, 2, \ldots n_s.$$

10. A computer program product executable by a computer processor for obtaining a seismic risk analysis parameter, the computer program product comprising:
    computer-readable instructions stored on a non-transitory computer readable medium for causing a computer, when executed by the computer processor, to perform operations of:
    a. receiving as input planning period $t_{EBE}$, where the planning period is the period an investor uses in a financial analysis of an economic-basis earthquake for a particular facility;
    b. calculating a risk analysis parameter based upon the planning period $t_{EBE}$;
    c. calculating an expected annualized loss (EAL) according to the following:

$$EAL=H \times PFL,$$

wherein PFL represents a probable frequent loss, an average loss conditioned on a seismic intensity associated with the economic-basis earthquake, and H represents an economic hazard coefficient; and
    d. determining the EAL in order to provide an expected annualized value of repair cost to a particular facility in the particular location;
    wherein in the operation of calculating a risk analysis parameter, the risk analysis parameter is hazard coefficient H, and the operation of calculating hazard coefficient H further comprising operations of:
    a. calculating $G_{EBE}$, where $G_{EBE}$ is an average exceedance frequency of $s_{EBE}$, and where $s_{EBE}$ is the seismic intensity associated with an economic-basis earthquake;
    b. identifying grid points closest to ô for location $\hat{o}=(\hat{\phi}, \hat{\lambda})$, where $\hat{\phi}$ denotes a latitude designation and $\hat{\lambda}$ denotes a longitude designation, the grid points closest to ô being referred to as the bounding grid points $o_j$;
    c. considering the period of interest $\hat{T}$, determining a period of at least one hazard curve, referred to as a bounding period $T_i$;
    d. letting $s_{r,k}$ denote the $k^{th}$ value (k=1, 2, … $n_s$) of $s_r$ in the hazard curve $G(s_r|o_r,c=c_r,T=T_i,=_r)$ and adjusting $s_{r,k}$ for each bounding grid point $o_j$ and bounding period $T_i$ to account for site classification $\hat{c}$ and for damping ratio $\hat{\zeta}$, where s is seismic intensity and where adjusting $s_{r,k}$ is done by multiplying $s_{r,k}$ by a site-classification coefficient $F_c$ and a damping coefficient F, where by denoting by $s_k$ the $k^{th}$ value of s at the same location and period after adjusting for site classification and damping ratio, $$G(s_k|o_j,c=\hat{c},T=T_i,=\hat{\zeta})=G(F_c F s_{r,k}|o_j,c=c_r,T=T_i,=_r):k=1, 2, \ldots n_s;$$

e. letting $G_{i,j,NZ}$ denote the damping- and site-class-adjusted average exceedance frequency of $s_{NZ}$ given period $T_i$ and location $o_j$, and for each $T_i$ and $o_j$, interpolating each curve from "Act d" to determine $G_{i,j,NZ}$;
    f. letting $G_{j,NZ}$ denote the damping- and site-class-adjusted value of $G_{NZ}$ at the period of interest $\hat{T}$ and location $o_j$, and for each j, calculating $G_{j,NZ}$;
    g. letting $G_{NZ}$ denote the damping- and site-class-adjusted value of $G_{NZ}$ at the period of interest $\hat{T}$ and location of interest ô, and calculating $G_{NZ}$;
    h. calculating risk analysis parameter H (i.e., hazard coefficient) according to the following:

$$H \equiv \frac{G_{NZ}}{\ln(G_{NZ}/G_{EBE})},$$

whereby through H, a user may calculate an expected annualized loss (EAL) according to the following:

$$EAL=H \times PFL,$$

wherein PFL represents a probable frequent loss, mean loss conditioned on an occurrence of $s_{EBE}$.

11. A computer program product for obtaining a risk analysis parameter as set forth in claim 10, wherein the operation of calculating $_{GEBE}$, $_{GEBE}$ is calculated based on $_{tEBE}$ and $_{pEBE}$ assuming Poisson earthquake arrivals according to the following:

$$G_{EBE}=-\ln(1-p_{EBE})/t_{EBE},$$

where $G_{EBE}$ is a mean annual exceedance frequency of $s_{EBE}$, where $s_{EBE}$ is the seismic intensity associated with an economic-basis earthquake, and where $p_{EBE}$ is the probability that earthquake shaking of intensity $s_{EBE}$ or greater will occur during planning period $t_{EBE}$.

12. A computer program product for obtaining a risk analysis parameter as set forth in claim 10, wherein the operation of identifying grid points closest ô for location $\hat{o}=(\hat{\phi}, \hat{\lambda})$, further comprises operations of identifying four grid points closest to ô for location $\hat{o}=(\hat{\phi}, \hat{\lambda})$, where $\hat{\phi}$ denotes a latitude designation and $\hat{\lambda}$ denotes a longitude designation, the four grid points closest to ô being referred to as the bounding grid points $o_1=(\phi_1, \lambda_1)$, $o_2=(\phi_1+\Delta\phi, \lambda_1)$, $o_3=(\phi_1, \lambda_1+\Delta\lambda)$ and $o_4=(\phi_1+\Delta\phi, \lambda_1+\Delta\lambda)\}$, where $o_1, o_2, o_3, o_4 \in \{(\phi_r, \lambda_r)\}$ such that $\phi_{min} \leq \phi_1 < \hat{\phi} \leq \phi_1 + \Delta\phi_{max}$ and $\lambda_{min} \leq \lambda_1 < \hat{\lambda} \leq \lambda_1 + \Delta\lambda \leq \lambda_{max}$, and calculating x and y according to the following:

$$x=(\hat{\phi}-\phi_1)/(\Delta\phi) \text{ and } y=(\hat{\lambda}-\lambda_1)/(\Delta\lambda).$$

13. A computer program product for obtaining a risk analysis parameter as set forth in claim 10, wherein the operation of determining a period of at least one hazard curve, further comprises an operation of determining periods of two hazard curves, referred to as bounding periods, $T_1, T_2 \in \{T_r\}$, such that $T_1 < \hat{T} \leq T_2$, or $T_1 = \hat{T}$ if $\hat{T}$ is in $\{T_r\}$ and is equal to its minimum value, and $T_1$ is the maximum value of $\{T_r\}$ satisfying these conditions and $T_2$ is the minimum value of $\{T_r\}$ satisfying these conditions.

\* \* \* \* \*